(12) United States Patent
Otsuka et al.

(10) Patent No.: US 7,446,567 B2
(45) Date of Patent: Nov. 4, 2008

(54) SIGNAL TRANSMISSION APPARATUS AND INTERCONNECTION STRUCTURE

(75) Inventors: Kanji Otsuka, 1074-38, Kohan 2-chome, Higashiyamato-shi, Tokyo 207-0002 (JP); Tamotsu Usami, 38-4, Nishimachi 2-chome, Kokubunji-shi, Tokyo 185-0035 (JP)

(73) Assignees: Kanji Otsuka, Tokyo (JP); Tamotsu Usami, Tokyo (JP); Oki Electric Industry Co., Ltd., Tokyo (JP); Sanyo Electric Co., Ltd., Osaka (JP); Sharp Kabushiki Kaisha, Osaka (JP); Sony Corporation, Tokyo (JP); Kabushiki Kaisha Toshiba, Tokyo (JP); NEC Corporation, Tokyo (JP); Fujitsu Limited, Kanagawa (JP); Matsushita Electric Industrial Co., Ltd., Osaka (JP); Renesas Technology Corp., Tokyo (JP); Rohm Co., Ltd., Kyoto (JP)

( * ) Notice: Subject to any disclaimer, the term of this patent is extended or adjusted under 35 U.S.C. 154(b) by 906 days.

(21) Appl. No.: 10/775,223

(22) Filed: Feb. 11, 2004

(65) Prior Publication Data

US 2004/0165669 A1 Aug. 26, 2004

(30) Foreign Application Priority Data

Feb. 21, 2003 (JP) ............................... 2003-043652

(51) Int. Cl.
*H03K 17/16* (2006.01)
*H03K 19/094* (2006.01)

(52) U.S. Cl. ............................. 326/82; 326/26; 326/27; 326/83; 326/86

(58) Field of Classification Search ............. 326/26–27, 326/82–83, 86
See application file for complete search history.

(56) References Cited

U.S. PATENT DOCUMENTS 5,565,812 A * 10/1996 Soenen ....................... 327/558

(Continued)

FOREIGN PATENT DOCUMENTS

JP 9-83203 3/1997

(Continued)

OTHER PUBLICATIONS

Kanji Otsuka et al., "Measurement Potential Swing by Electric Filed on Package Transmission Lines," 2001 ICEP Proceedings, pp. 490-495.

(Continued)

*Primary Examiner*—Rexford Barnie
*Assistant Examiner*—Thienvu V Tran
(74) *Attorney, Agent, or Firm*—Volentine & Whitt, P.L.L.C.

(57) ABSTRACT

Apparatus for transmitting a digital signal within, for example, an integrated circuit includes a signal transmission line with a directional coupler at one or both ends. The directional coupler blocks the direct-current component of the digital signal while transmitting the alternating-current component, including enough higher harmonics to transmit a well-defined pulse waveform. A suitable directional coupler consists of two adjacent line pairs in materials with different dielectric constants. The apparatus may also include a driver of the inverter type, a receiver of the differential amplifier type, a terminating resistor, and a power-ground transmission line pair for supplying power to the driver. An all-metallic transmission-line structure is preferably maintained from the output interconnections in the driver to the input interconnections in the receiver.

29 Claims, 25 Drawing Sheets

U.S. PATENT DOCUMENTS

| | | | |
|---|---|---|---|
| 6,147,522 A * | 11/2000 | Rhode et al. | 327/93 |
| 6,272,185 B1 | 8/2001 | Brown | |
| 6,636,084 B2 * | 10/2003 | Sarraj | 327/95 |
| 7,307,492 B2 * | 12/2007 | Tripathi et al. | 333/111 |
| 2002/0041193 A1 * | 4/2002 | Tamura et al. | 326/86 |
| 2002/0063269 A1 * | 5/2002 | DiBene, II | 257/275 |

FOREIGN PATENT DOCUMENTS

| | | |
|---|---|---|
| JP | 9-130431 | 5/1997 |
| JP | 11-284126 | 10/1999 |
| JP | 2000-13452 | 1/2000 |
| JP | 2000-174505 | 6/2000 |
| JP | 2002-26272 | 1/2002 |
| JP | 2002-84107 | 3/2002 |
| JP | 2002-124635 | 4/2002 |
| JP | 2002-259000 A | 9/2002 |
| WO | WO 99/52248 | 10/1999 |

OTHER PUBLICATIONS

Kanji Otsuka et al, "Measurement Evidence of Mirror Potential Traveling on Transmission Lines," The Fifth VLSI Packaging Workshop of Japan, 2000, pp. 27 and 28.

Kanji Otsuka et al., "Stacked Pair Line," JIEP Journal, vol. 4, No. 7, pp. 556-561 (Nov. 2001).

Papers at the 15th conference of the Silicon Technology research group of the Japan Applied Physics society in a session Titled "Problems and prospects in ultra-high-speed multilayer interconnect technology," Feb. 18, 2000, University of Tokyo, Yamagami Hall.

* cited by examiner

FIG.7

| f [MHz] | 10f [GHz] | $L_{Global-Min}$ (m) $v=1\times10^5$ m/s | $L_{Global-Min}$ (m) $v=1.5\times10^5$ m/s | $L_{Global-Min}$ (m) $v=2\times10^5$ m/s |
|---|---|---|---|---|
| 5 | 0.05 | 0.5 | 0.75 | 1 |
| 10 | 0.1 | 0.25 | 0.375 | 0.5 |
| 50 | 0.5 | 0.05 | 0.075 | 0.1 |
| 80 | 0.8 | 0.03125 | 0.0375 | 0.0625 |
| 100 | 1 | 0.025 | 0.0375 | 0.05 |
| 300 | 3 | 0.008325 | 0.012485 | 0.01665 |
| 500 | 5 | 0.005 | 0.0075 | 0.01 |
| 1000 (1GHz) | 10 | 0.0025 | 0.00375 | 0.005 |
| 10000 (10GHz) | 100 | 0.00025 | 0.000375 | 0.0005 |
| 100GHz | 1000 | 25 μm | 37.5 μm | 50 μm |

0 V/m          1.31e+004 V/m

3GHz SINEWAVE

3GHz SINEWAVE

0 V/m     1.31e+004 V/m

SINEWAVE
FREQUENCY (Hz)
L/S=1/1

SINEWAVE
FREQUENCY (Hz)
L/S=1/0.5

SINEWAVE
FREQUENCY (Hz)
L/S=1/0.25

- $SiO_2 : \varepsilon_r = 3.2$
- ALUMINA : $\varepsilon_r = 8$
- $SiO_2 : \varepsilon_r = 3.2$ $h_1 = 0.4mm \quad h_2 = 0.68$ $SiO_2 : \varepsilon_r = 3.2$

FIG.21

| SCALE | 1 | 1/100 | 1/1000 |
|---|---|---|---|
| L | 1mm | 10 $\mu$m | 1 $\mu$m |
| w | 0.08mm | 0.8 $\mu$m | 80nm |
| g | 0.01mm | 0.1 $\mu$m | 10nm |
| t | 0.2mm | 2 $\mu$m | 0.2 $\mu$m |
| D | 0.08mm | 0.8 $\mu$m | 80nm |

SIGNAL TRANSMISSION APPARATUS AND INTERCONNECTION STRUCTURE

BACKGROUND OF THE INVENTION

1. Field of the Invention

The present invention relates to signal transmission apparatus for transmitting a digital (pulse) signal on a transmission line, and in particular to the signal-line structure of the transmission line.

2. Description of the Related Art

A digital signal has a complex waveform that can be analyzed as a Fourier series of sinewave components ranging from a direct-current (dc) component to a fundamental clock frequency component and higher harmonics thereof. Due to the complexity of its waveform, a digital signal cannot be transmitted through a filter circuit such as the inductor-capacitor (LC) filter circuits that are employed when only a single sinewave frequency, or a narrow band of frequencies, is transmitted. Conventional digital signal transmission apparatus uses dc coupling between the transmission line and its driver and receiver. Because of the conventional dc coupling, the dc component of the digital signal is transmitted together with the fundamental clock-frequency component and other high-frequency components. That is, dc current is drawn, consuming unnecessary power.

Relevant information about the transmission of digital signals can be found in, for example, Japanese Unexamined Patent Application Publication Nos. 11-284126, 2000-174505, and 2002-124635. Further information can be found in Otsuka, et al., "Measurement of Potential Swing by Electric Field on Package Transmission Lines," Proceedings of ICEP, pp. 490-495 (April 2001, hereinafter, Reference 1a); Otsuka, et al., "Measurement Evidence of Mirror Potential Traveling on Transmission Lines," Technical Digest of 5th VLSI Packaging Workshop of Japan, pp. 27-28 (December 2000, hereinafter, Reference 1b); and Otsuka et al., "Sutakkuto pea senro" (Stacked-pair lines), JIEP Journal, Vol. 4, No. 7, pp. 556-561 (November 2001, hereinafter, Reference 2). Further information was also presented in a paper at the 15th conference of the Silicon Technology research group of the Japan Applied Physics Society in a session titled "Chokosoku taso haisen gijutsu no kadai to tenbo tokushu" (Problems and prospects in ultra-high-speed multilayer interconnect technology, Feb. 18, 2000, University of Tokyo, Yamagami Hall, hereinafter referred to as the Silicon Technology conference).

SUMMARY OF THE INVENTION

An object of the present invention is to reduce the unnecessary consumption of power by the transmission of the dc component of a digital signal.

The present invention provides a transmission line with a directional coupler that blocks the dc component of a digital signal while transmitting a wideband alternating-current (ac) component. The directional coupler may be disposed at either the transmitting end or the receiving end of the transmission line, or at both ends. Power consumption is reduced because only the wideband ac component is transmitted.

The longest interconnections within an integrated circuit tend to be buses interconnecting different functional blocks. It is these buses, also referred to as global signal lines, that are mainly addressed by the present invention. The long resistance-capacitance (RC) delays associated with these buses become intolerable in a chip having a gigahertz clock, so chips operating at gigahertz speeds conventionally have many repeater circuits. These repeater circuits, however, together with RC circuit elements, consume enough energy to generate fluctuations referred to as ground bounce in the power-supply and ground levels. Ground bounce can cause logic circuits to operate incorrectly, and is also a factor in electromagnetic interference. The consumption of energy also limits the use of such chips in mobile devices, and leads to structural complications due to the need for heat sinking. By reducing power consumption, the invented signal transmission apparatus mitigates these problems.

A complementary metal-oxide semiconductor (CMOS) inverter is often used as the basic driver circuit for a bus. The invented signal transmission apparatus uses a driver having this most simple inverter or buffer structure, without the need for any new circuit or new manufacturing process, and will remain applicable despite future technological advances.

The transmission lines interconnecting different functional blocks within a large-scale integrated circuit chip can be treated as distributed constant lines. Given an ideal power supply, the length of a distributed constant transmission line determines its delay time, enabling chips to be designed with very low clock skew on data paths having a bit width of, for example, 64 bits, and enabling a clock signal to be distributed on an H-tree network of transmission lines with a skew of only a few picoseconds or less. The invented signal transmission apparatus uses this type of transmission line.

Ideally, electromagnetic energy is confined within a transmission line, so there is no waveform distortion of the type caused by RC delay in an integrating element. Although the maximum amplitude drops according to Ohm's law because of the dc resistance of the transmission line, this causes negligible delay because the waveform is not distorted, and if the different lines carrying data with a given bit width all have the same structure and size, skew becomes virtually zero.

If the current sourcing and sinking capabilities of the power supply and ground differ from one inverter to another, however, since an inverter can only switch states as fast as these capabilities allow, the waveforms from different inverters will not only be skewed; they will include extra harmonic components, causing singular resonant phenomena. In the present invention, accordingly, power is supplied from a power-ground transmission line pair including a paired power supply line and a ground line. The characteristic impedance of the power-ground transmission line pair can be set in relation to the on-resistance of the driver transistors and the RC delay of the signal transmission line so as to provide adequate current sourcing and sinking capabilities even if the on-resistance and RC delay are comparatively large. This is one feature of the present invention.

A signal transmission line is analogous to a water pipe having a certain diameter; energy reflection occurs at discontinuities in the line. If the energy reflected back from a discontinuity is reflected forward again by another discontinuity, the ensuing repeated multiple reflections can lead to resonance, generating waveforms that are substantially unpredictable. A second feature of the present invention is that the digital signal transmission line can be designed both to block direct current and to prevent reflection, by employing a transmission line structure with the same characteristic impedance from the transmitting end to the receiving end, analogous to a water pipe having one diameter from beginning to end.

There are four well-known reflection prevention methods. The first method, which is often used on printed circuit boards or cards, is to insert a damping resistor at the driver end. The second method is to design the on-resistance of the driver to match the characteristic impedance of the transmission line. The third method is to design the on-resistance of the drivers at both ends of a bi-directional bus to match the resistance of the transmission line (which may also have damping resistors inserted at both ends). The fourth method, which is the ideal method but has conventionally been disliked because it has the drawback of continuous current flow, is to provide a matched terminating resistor at the end of the transmission line. The present invention extends these methods from circuit boards to an on-chip bus, and provides a fifth method that connects a terminating resistor to the end of the transmission line through a coupler, thereby avoiding the problem of continuous current flow.

A third feature of the present invention is that the entire signal transmission line, from the driver interconnections to the receiver interconnections, can function as a true transmission line on which signals travel with the speed of electromagnetic waves, rather than direct-current speed. This requires the use not only of a directional coupler to block the dc signal component, but also the use of metallic signal-line elements. Although signals can travel with the speed of electromagnetic waves over metallic line elements, this speed is not attained in semiconductors, in which signal transmission depends on carrier mobility. Accordingly, starting from the transistor contacts, all signal-line elements used in the present invention are preferably metallic; no polycrystalline silicon (polysilicon) or metal-semiconductor compound materials (e.g., silicide) should be used in the line elements. If necessary, the receiver may have metallic gate electrodes. In the device design stage, the planar structure and metalization structure should be designed on the premise that transmission lines must be able to transmit signals at electromagnetic-wave speed, and the layout of transistors should proceed from there.

Implementation of the third feature of the invention enables a digital signal with a clock frequency several times higher than ten gigahertz to be transmitted over a transmission line ten millimeters (10 mm) long, and gives bus systems adequate capability to adapt to future developments in the switching speeds of inverters and buffers.

The present invention provides a signal transmission apparatus and interconnection structure that are simple and scalable, can be scaled down to very small sizes, and enable power consumption to be reduced.

BRIEF DESCRIPTION OF THE DRAWINGS

In the attached drawings:

FIG. 7 is a table of minimum global signal line lengths;

FIG. 21 is a table showing examples of scaling of directional coupler dimensions;

DETAILED DESCRIPTION OF THE INVENTION

Figure 1:
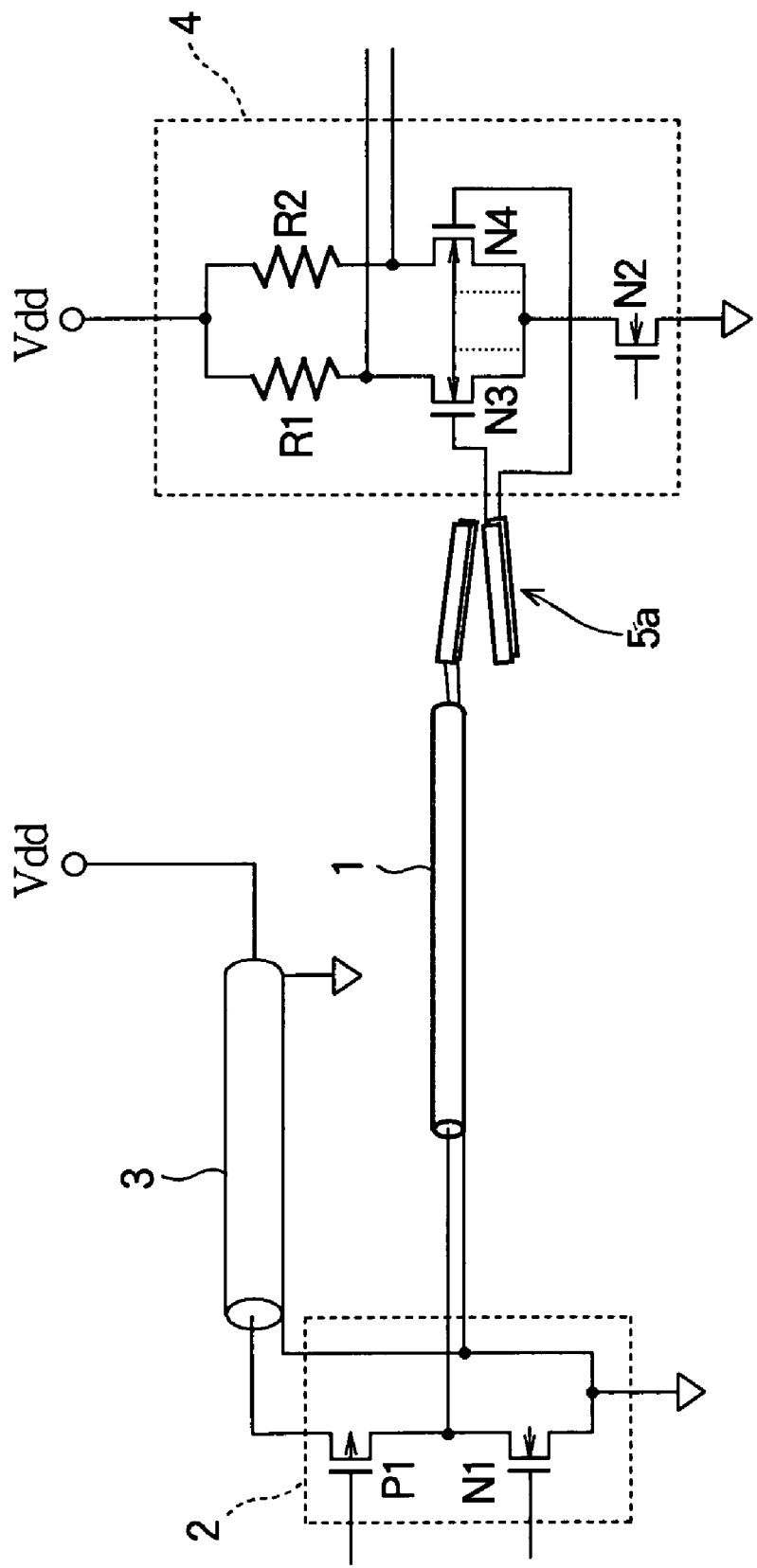
FIG. 1 is a schematic diagram illustrating a first embodiment of the invention, having a single coupler at the receiving end.

Embodiments of the invention will now be described with reference to the attached drawings, in which like elements are indicated by like reference characters. The embodiments include a first embodiment with a single coupler at the receiving end (FIG. 1), a second embodiment having a double-coupler configuration (FIG. 2), a third embodiment having a double-coupler configuration with a terminating resistor (FIG. 3), a fourth embodiment with a single coupler at the transmitting end (FIG. 4), and a fifth embodiment having a double-coupler configuration with a terminating resistor (FIG. 5).

Referring to FIG. 1, the signal transmission apparatus in the first embodiment (having a single coupler at the receiving end) comprises a signal transmission line 1, a driver 2, a power-ground transmission line pair 3, a receiver 4, and a directional coupler 5a, all of which are disposed in a single large-scale integrated (LSI) circuit chip (not shown).

The signal transmission line 1 comprises a paired signal line and ground line. The signal transmission line 1 is long enough to have a non-negligible RC delay between its transmitting end and receiving end.

The driver 2 is connected directly to the transmitting end of the signal transmission line 1. The directional coupler 5a is inserted between the receiving end of the signal transmission line 1 and the receiver 4.

The driver 2 comprises a p-channel metal-oxide semiconductor (PMOS) transistor P1 and an n-channel metal-oxide semiconductor (NMOS) transistor N1. PMOS transistor P1 and NMOS transistor N1 are connected in series between the power supply and ground to form a CMOS inverter. The digital signal to be transmitted on the signal transmission line 1 is input to the gate electrodes of PMOS transistor P1 and NMOS transistor N1. The drain electrodes of PMOS transistor P1 and NMOS transistor N1 (which form the output terminal of the driver 2) are connected to the transmitting end of the signal line in the signal transmission line 1. The source electrode of NMOS transistor N1 is connected to the substrate ground (reference ground) of the LSI chip and to the transmitting end of the ground line in the signal transmission line 1.

The driver 2 is powered through the power-ground transmission line pair 3. The power-ground transmission line pair 3 is connected to a power supply circuit (not shown) that supplies power at a predetermined voltage Vdd, or to a nearby bypass capacitor (decoupling capacitor, not shown). The power-ground transmission line pair 3 comprises a power supply line and a ground line. One end of the power supply line is connected to the source electrode of PMOS transistor P1 in the driver 2; the other end of the power supply line is connected to the power supply terminal of the power supply circuit or the bypass capacitor. The ground line in the power-ground transmission line pair 3 is grounded at both ends: one end is connected through the driver 2 to the substrate ground of the LSI chip; the other end is connected to the ground terminal of the power supply circuit or the bypass capacitor.

The receiver 4 comprises NMOS transistors N2, N3, N4, and a pair of resistors R1, R2. The drain electrodes of the differential pair of input NMOS transistors N3 and N4 are connected through the resistors R1, R2 to the power supply Vdd. The drain electrode of the current control NMOS transistor N2 is connected to the source electrodes of NMOS transistors N3 and N4; the source electrode of NMOS transistor N2 is connected to the substrate ground of the LSI chip (reference ground).

The directional coupler 5a has a simple and compact structure comprising an energy input line pair and an energy transmitting line pair, both having a predetermined length, disposed in close proximity in materials of different dielectric constants. The directional coupler 5a blocks the dc component of the input digital signal, and passes a wideband ac component. The input end of the energy input line pair is connected to the receiving end of the signal transmission line 1; the output end is left open and floating. The output end of the energy transmitting line pair is connected to the gate electrodes of the differential input NMOS transistors N3 and N4 in the receiver 4; the input end of this line pair is left open and floating.

Figure 2:
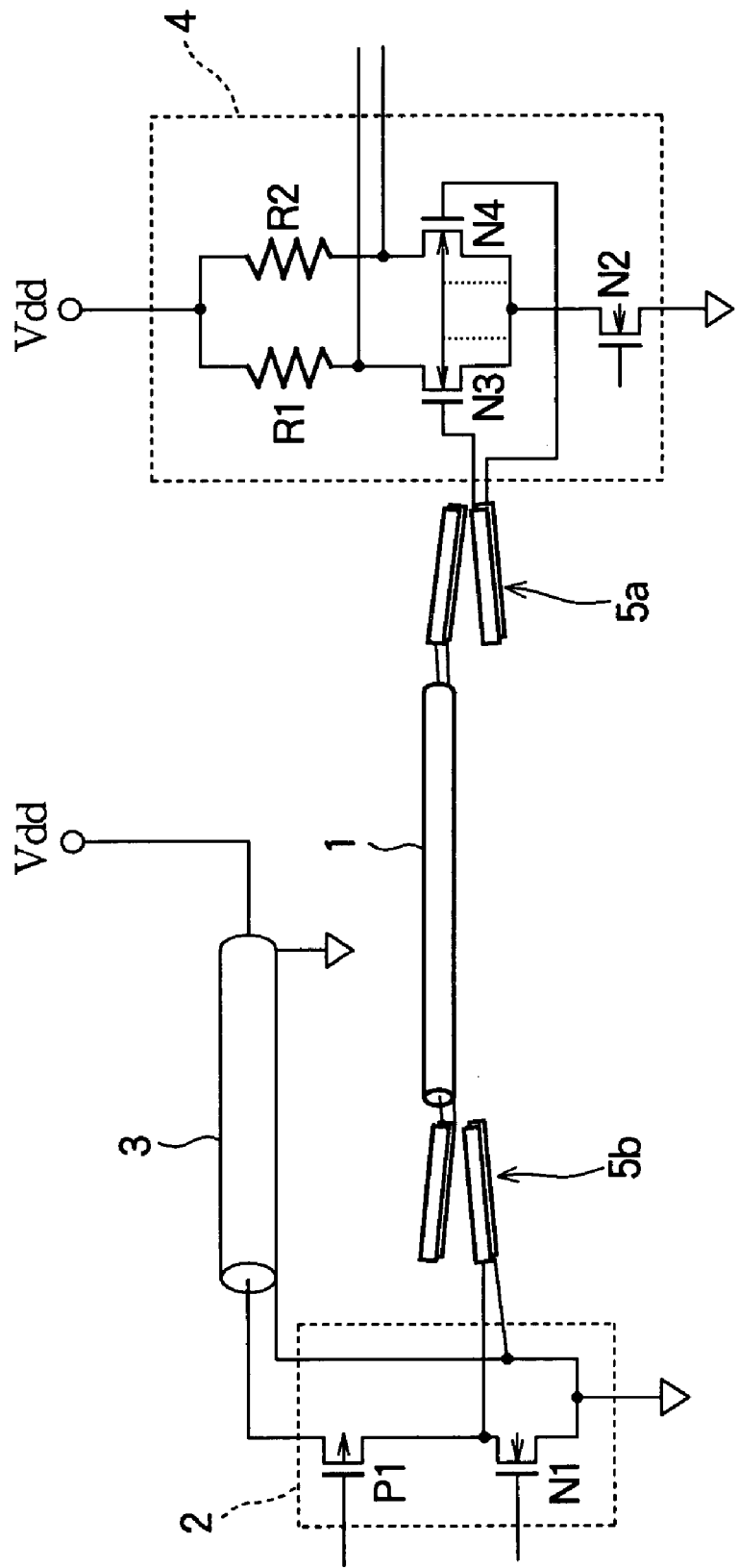
FIG. 2 is a schematic diagram illustrating a second embodiment of the invention, having a double-coupler configuration.

Referring to FIG. 2, the signal transmission apparatus in the second embodiment adds a second directional coupler 5b, inserted between the driver 2 and the transmitting end of the signal transmission line 1, to the signal transmission apparatus in the first embodiment. This directional coupler 5b has a simple and compact structure similar to the structure of directional coupler 5a. The input end of the energy input line pair in directional coupler 5b is connected to the output terminal of the driver 2 and the reference ground; the output end is left open and floating. The output end of the energy transmitting line pair is connected to the transmitting end of the signal transmission line 1; the input end of this line pair is left open and floating.

Figure 3:
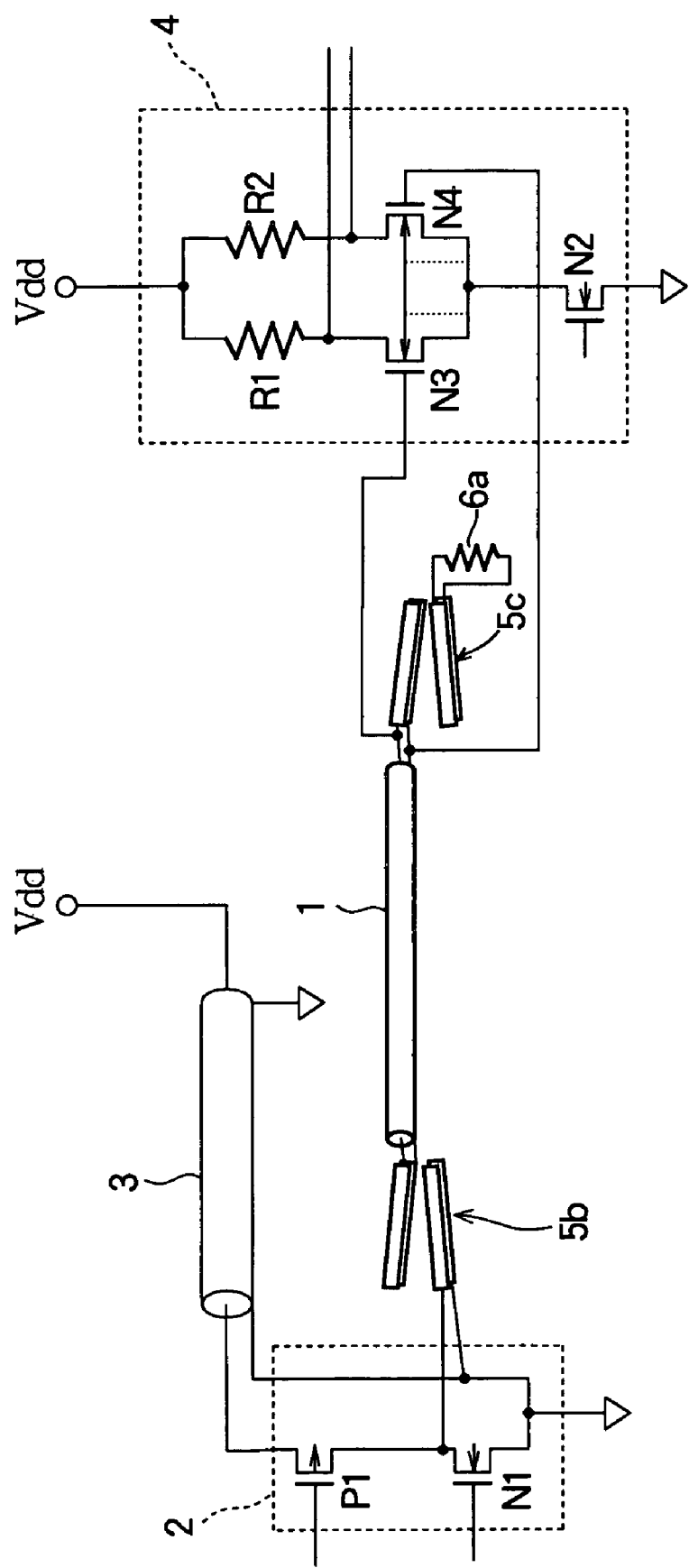
FIG. 3 is a schematic diagram illustrating a third embodiment of the invention, having a double-coupler configuration with a terminating resistor.

Referring to FIG. 3, the signal transmission apparatus in the third embodiment differs from the signal transmission apparatus in the second embodiment in that the directional coupler 5c at the receiving end of the signal transmission line 1 is connected to a terminating resistor 6a instead of to the receiver 4. The receiver 4 is connected directly to the receiving end of the signal transmission line 1. The directional coupler 5c has a simple and compact structure similar to the structure of the directional coupler 5a in the first embodiment. The input end of the energy input line pair in the directional coupler 5c is connected to the receiving end of the signal transmission line 1; the output end of this line pair is left open and floating. The terminating resistor 6a is connected across the output end of the energy transmitting line pair in the directional coupler 5c; the input end of this line pair is left open and floating.

Figure 4:
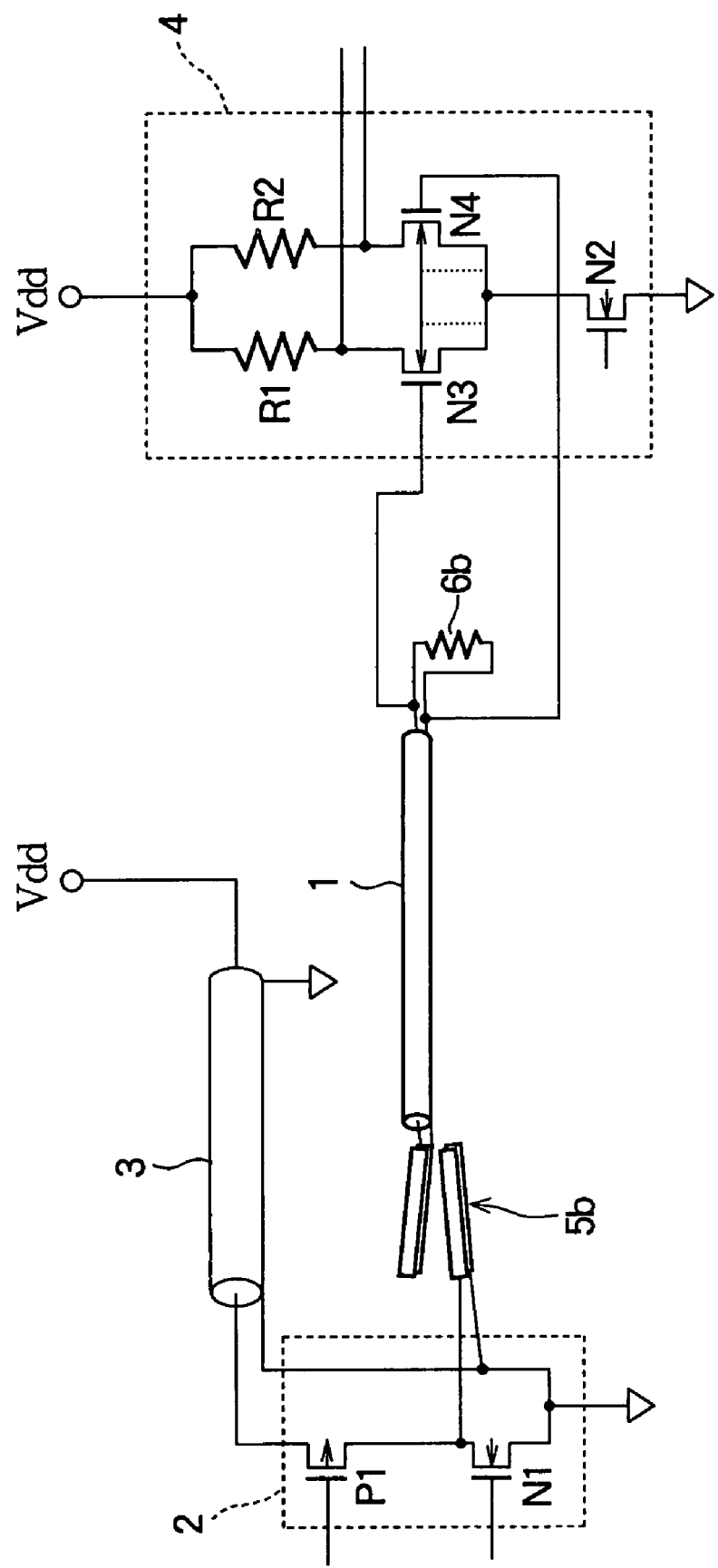
FIG. 4 is a schematic diagram illustrating a fourth embodiment of the invention having a single coupler at the transmitting end.
Figure 5:
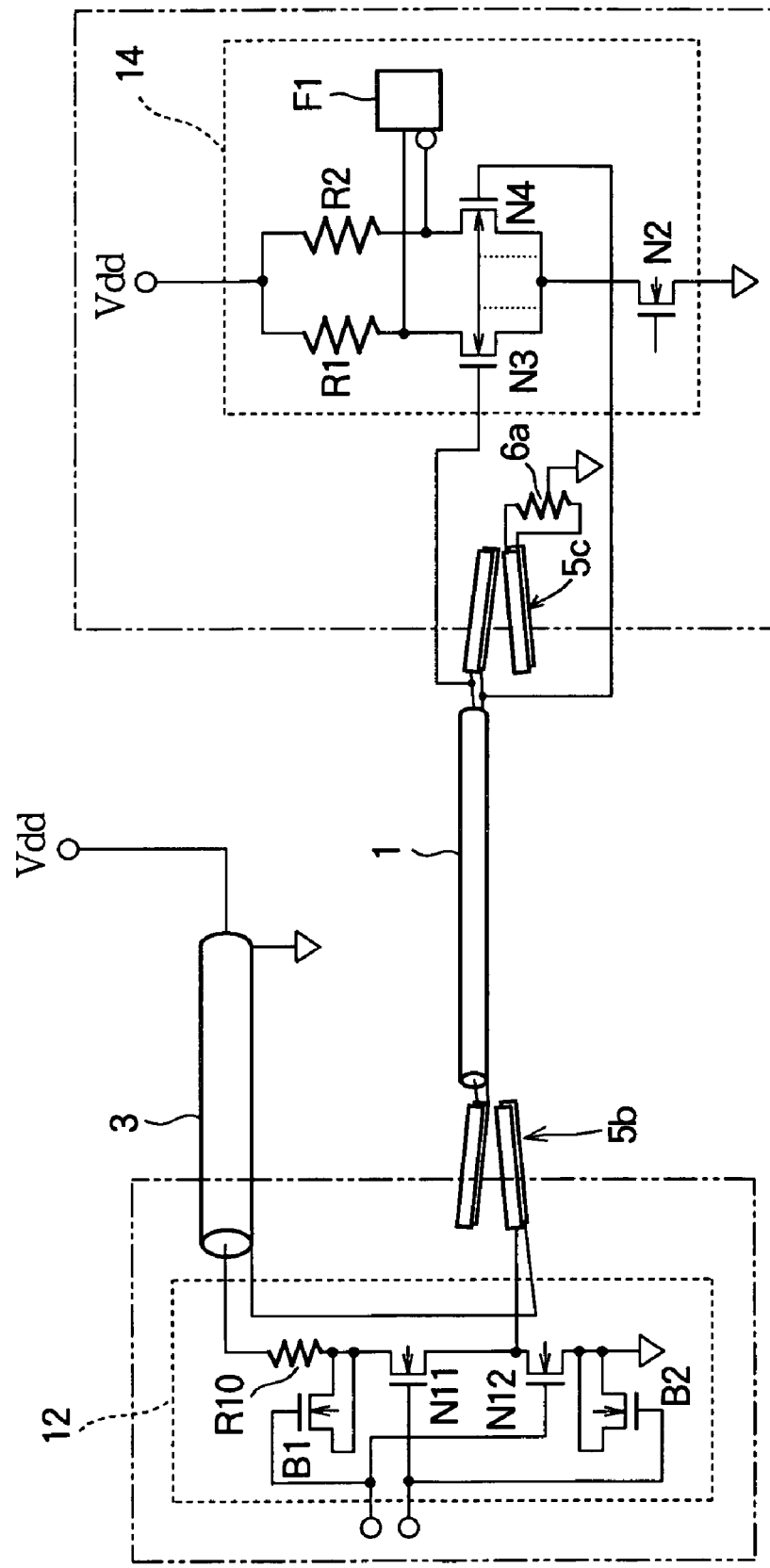
FIG. 5 is a schematic diagram illustrating a fifth embodiment of the invention, having a double-coupler configuration with a terminating resistor.

Referring to FIG. 4, the signal transmission apparatus in the fourth embodiment differs from the signal transmission apparatus in the third embodiment by removing the directional coupler 5c at the receiving end. The receiver 4 is again connected directly to the receiving end of the signal transmission line 1. The terminating resistor 6b is connected across the receiving end of the signal transmission line 1.

Referring to FIG. 5, the signal transmission apparatus in the fifth embodiment differs from the signal transmission apparatus in the third embodiment by including a different driver 12 and a different receiver 14. The fifth embodiment is applicable when the digital signal to be transmitted is a differential signal.

The driver 12 comprises a pair of NMOS transistors N11, N12, a pair of inversion mode NMOS varactors B1, B2, and a resistor R10. The differential digital signal is input to the gate electrodes of NMOS transistors N11 and N12, which are connected in series between the power supply and ground. The source electrode of NMOS transistor N11 and the drain electrode of NMOS transistor N12, which form the output terminal of the driver 12, are connected to the transmitting end of the signal line in the signal transmission line 1. The drain electrode of NMOS transistor N11 is connected through resistor R10 to the power supply line in the power-ground transmission line pair 3. The source electrode of NMOS transistor N12 is connected to the substrate ground (reference ground) of the LSI chip. The source and drain electrodes of NMOS varactor B1 are connected to the drain electrode of NMOS transistor N11, and the gate electrode of NMOS varactor B1 is connected to the gate electrode of NMOS transistor N12; the source and drain electrodes of NMOS varactor B2 are connected to the source electrode of NMOS transistor N12, and the gate electrode of NMOS varactor B2 is connected to the gate electrode of NMOS transistor N11.

The receiver 14 differs from the receiver 4 in FIG. 3 by including a latch circuit F1 connected as an output stage to the drains of the differential pair of input NMOS transistors N3 and N4.

One method of preventing an RC delay in a comparatively long signal line in a chip was described at the Silicon Technology conference mentioned above. In this method, a long (global) signal line having a non-negligible RC delay is defined as a signal line for which the signal line length $L_{Global}$ satisfies the following condition (1), which may be given in terms of the wavelength ($\lambda$) of the fundamental sinewave signal component, or in terms of the electromagnetic wave velocity (v) on the signal line and the maximum frequency (f) of the pulse signal transmitted on the signal line.

$$L_{Global} \geq (1/40)\lambda = (1/40)(v/f) \quad (1)$$

The electromagnetic wave velocity is given by the speed of light in a vacuum ($c_0$), the relative magnetic permeability ($\mu_r$) of the dielectric material surrounding the signal line, and the dielectric constant ($\epsilon_r$) of this dielectric material as in the equation below.

$$v = c_0/\sqrt{(\mu_r \epsilon_r)} \quad (2)$$

Figure 6:
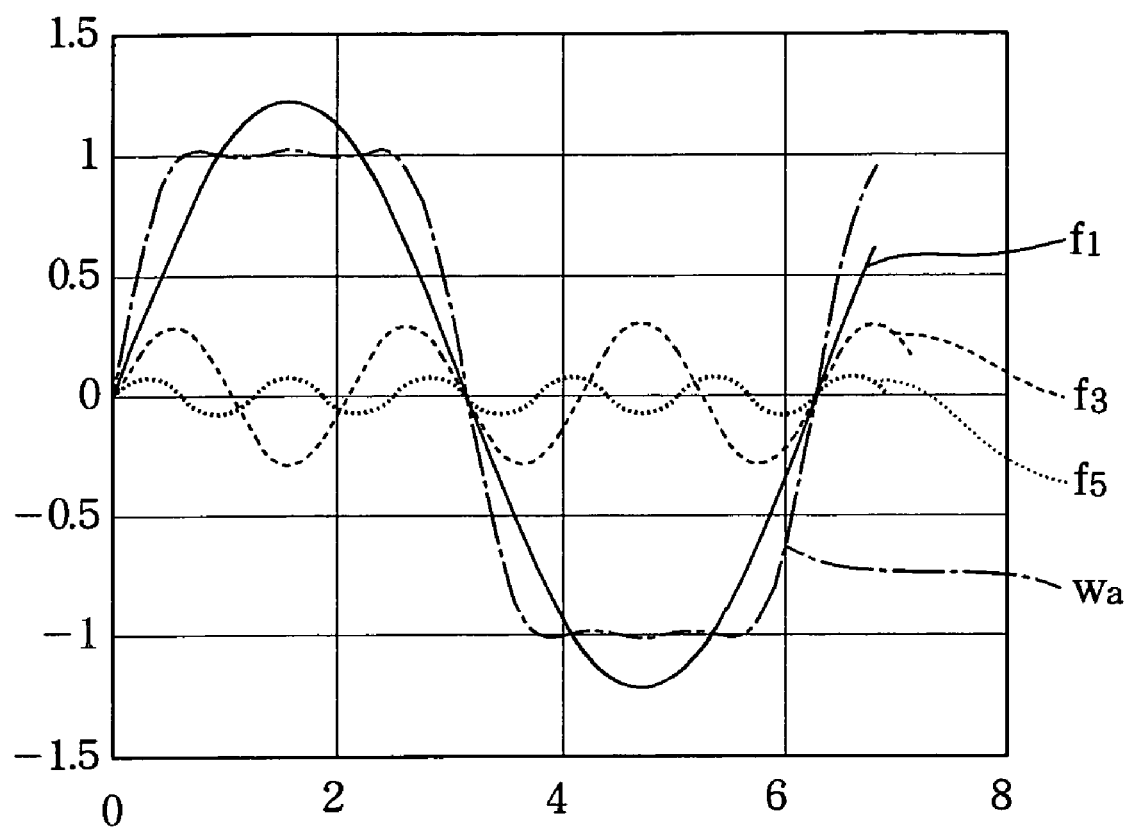
FIG. 6 is a waveform diagram illustrating components of a pulse signal.

The coefficient of 1/40 in condition (1) will be explained below with reference to FIG. 6, which illustrates waveform components of one pulse in a digital signal. A pulse signal has a complex waveform including a fundamental sinewave component and higher harmonic sinewave components. An approximate pulse waveform $w_a$ is obtained by adding the third and fifth harmonic components ($f_3$, $f_5$) to the fundamental component ($f_1$). A nearly perfect pulse waveform is obtained by also adding the seventh, ninth, and eleventh harmonic components. A pulse signal may accordingly be treated as including components with frequencies up to one order of magnitude higher than the pulse frequency. For example, if a pulse signal has a maximum frequency of one gigahertz (1 GHz), frequencies as high as 10 GHz must be taken into account. Furthermore, the minimum resonance frequency corresponds to (1/4)$\lambda$, as in a tuning fork.

Accordingly, condition (1) states that a signal transmission line must be treated as a distributed constant line if it is longer than one quarter of the wavelength (1/10)$\lambda$ of the highest component frequency of the transmitted pulse signal, i.e., longer than (1/40)$\lambda$. In the disclosure at the Silicon Technology conference, a margin of safety $\alpha$ was allowed: (1/40)$\lambda - \alpha$ was defined as the limit length of a (local) signal line that can be treated in the conventional fashion as a lumped constant circuit.

The present invention relates to a global signal line as defined by condition (1) (having a non-negligible RC delay due to the line structure and the frequency of the transmitted pulse signal), and to a driver and receiver for this signal line. The present invention is applicable to digital signals with clock frequencies several times higher than ten gigahertz.

FIG. 7 is a table of minimum values of the on-chip global signal line length $L_{Global-Min}$ in meters (m) for various pulse frequencies (f) and for three values of the electromagnetic wave velocity (v), also indicating the maximum frequency (10f) of the higher harmonics taken into account.

As in a household power line, two signal lines are basically needed for transmission of electrical energy. These signal lines have a conductance analogous to the diameter of a water pipe. The reciprocal of the conductance is the characteristic impedance $Z_0$.

The physical quantity to which the diameter corresponds is the energy stored in the inductance $L_0$ and capacitance $C_0$ per unit length of the signal line. Energy is repeatedly stored and removed, with a frequency corresponding to the signal frequency, therefore encountering an impedance Z, which is the opposition to current flow in an alternating current (ac) circuit. Differing from circuit elements that convert electrical energy into thermal energy, such as a dc resistance element or a leakage conductance between paired signal lines, this impedance Z does not lose energy but releases it with a delay, so it is treated as an imaginary number, given by the equations below, in which $\omega$ represents angular frequency and j represents the square root of minus one.

$$Z = j\omega L_0 \quad (3a)$$

$$Z = 1/(j\omega C_0) \quad (3b)$$

Equations (3a) and (3b) indicate that the impedance Z includes an inductance $L_0$ and capacitance $C_0$ per unit length of the signal line. The characteristic impedance $Z_0$ on the signal line is given as the geometric mean of these impedances Z as in the following equation (4).

$$Z_0 = \sqrt{(j\omega L_0/j\omega C_0)} = \sqrt{(L_0/C_0)} \quad (4)$$

As the angular frequency ($\omega$), the imaginary unit (j), and the unit length cancel out in equation (4), the characteristic impedance $Z_0$ is a real number that is not specified per unit length and does not vary with frequency. The characteristic impedance $Z_0$ is thus a special physical concept that is the same for a short signal line as for a signal line of infinite length. Put briefly, the characteristic impedance $Z_0$ determines the aperture of the signal line, with respect to electrical energy.

A universal misinterpretation of lumped constant circuit theory is that since a signal line is also an LC network, which must be treated as a distributed constant network, the issue of RC delay cannot be avoided. It should be understood that the electromagnetic phenomena that occur on a transmission line differ completely from RC delay, which in fact can be avoided.

The transmission line in the present invention is an entire circuit having a global signal line within a chip, or spanning chips. The invention provides a structure without impediments to energy transmission. This structure, including the transmission line and associated transistors, is analogous to the water pipe and valves in a water supply system, including the pipes that bring in water from a river.

Figure 8:
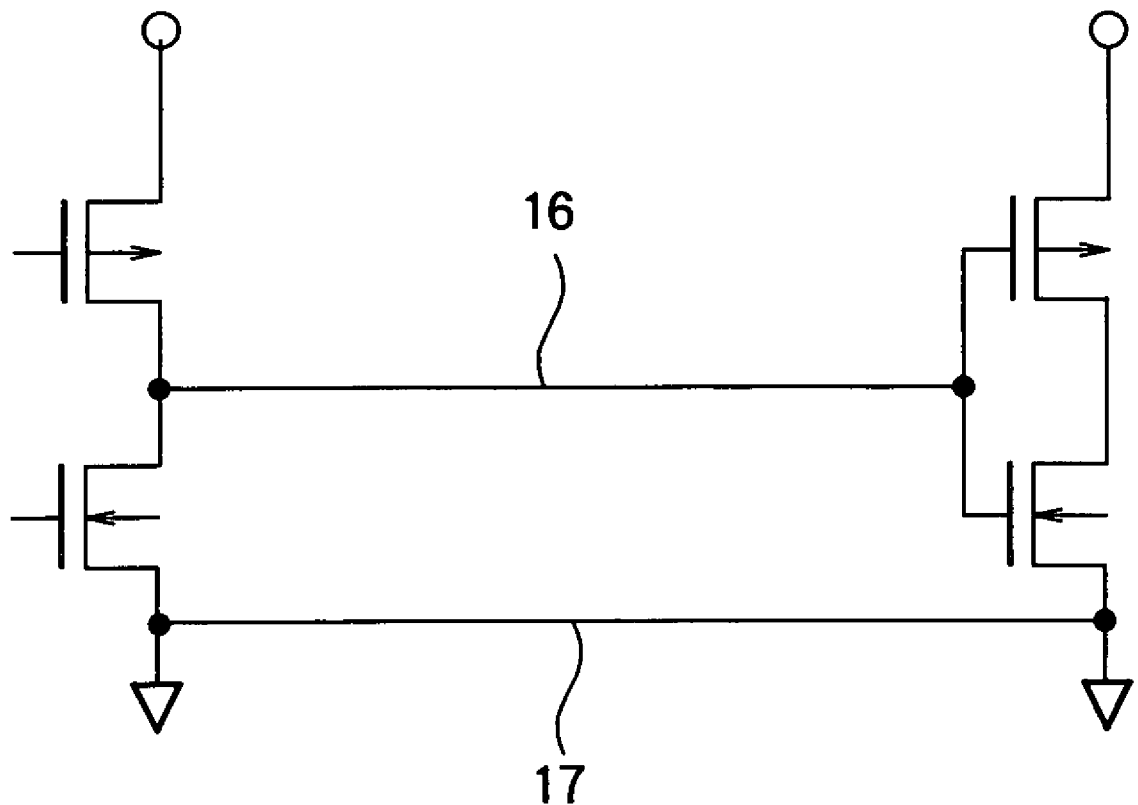
FIG. 8 is a schematic diagram illustrating a conventional single-ended digital signal transmission circuit.

FIG. 8 is a schematic diagram illustrating a conventional digital signal transmission circuit of the single ended type. Although there is only one signal line 16 in FIG. 8, by physical principles, the paired ground line 17 (or power supply line), which is conventionally ignored, is absolutely necessary for the transmission of electrical energy.

Figure 9A:
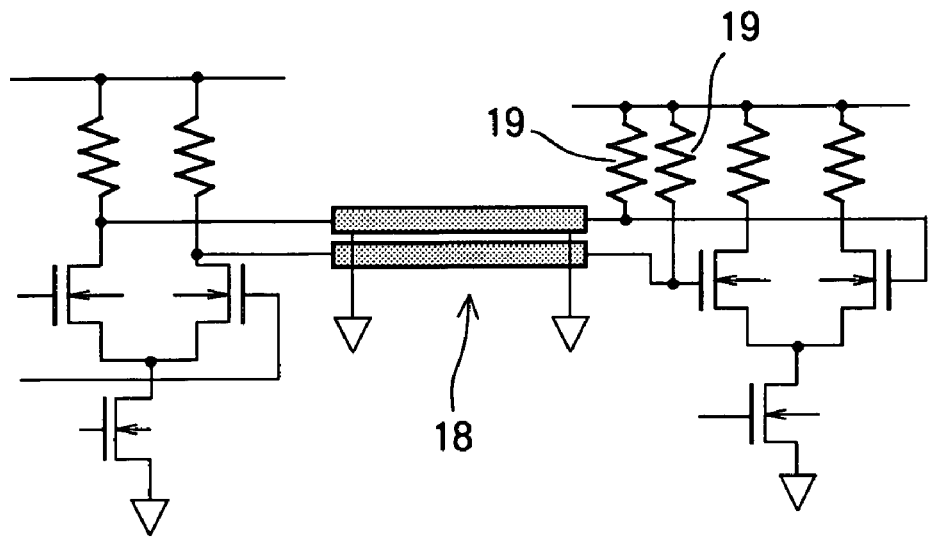
FIGS. 9A and 9B are schematic diagrams illustrating conventional differential digital signal transmission circuits.
Figure 9B:
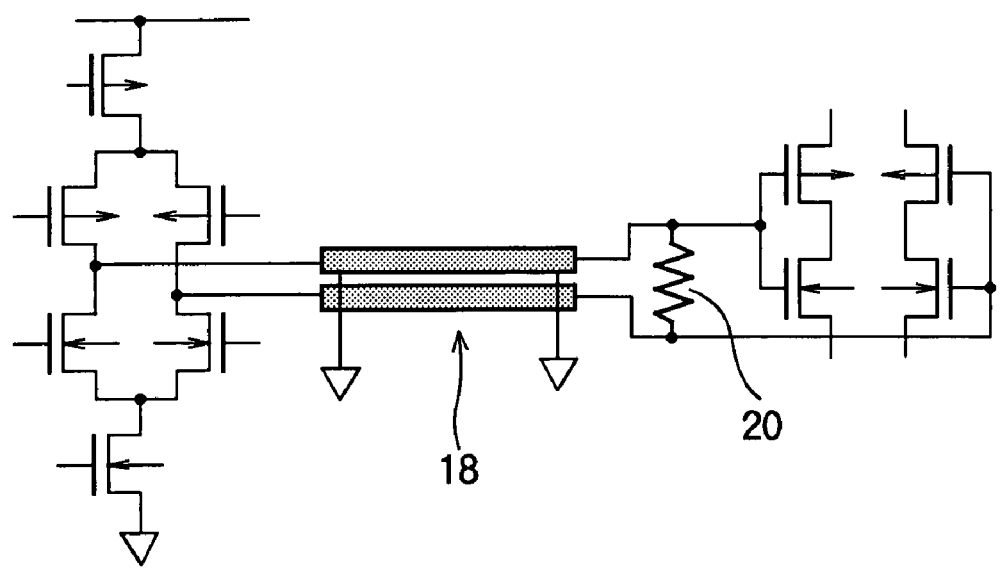

FIG. 9A is a schematic diagram illustrating a differential current mode logic (CML) circuit, while FIG. 9B illustrates a low voltage differential signaling (LVDS) circuit. Both of these circuits transmit differential digital signals; both circuits are considered suitable for high-speed transmission and have often been used in recent years. Although in terms of electrical energy a differential signal can be transmitted on any pair of lines, the transmission lines 18 in the conventional circuits in FIGS. 9A and 9B are referenced to ground in order to match the reference voltage level between devices, making them analogous to a three-phase ac line. They therefore need a terminating resistor tailored to the coupling coefficients of the line, but in practice, proper termination is often not provided. A significant drawback of these differential circuits is that the differential signal is frequently skewed due to variations in transistor characteristics, giving rise to large spike currents when state transitions occur, and causing electromagnetic interference (EMI). A further problem is that the necessary number of transistors is increased.

The present invention provides a simple structure in which a conventional single ended signal, generated by a driver of the inverter type shown in FIG. 8, is transmitted by use of a differential circuit that eliminates impediments to the transmission of electrical energy.

In the embodiments described above, the differential couplers 5a, 5b, and 5c are circuits that block direct current and prevent multiple reflections while passing a wideband ac signal.

The first embodiment (having a single coupler at the receiving end as shown in FIG. 1) has the simplest circuit structure. Charge is allowed to move into the signal transmission line 1, but there is no steady flow of dc current, because the directional coupler 5a at the receiving end is doubly open: the energy input line pair is open at the input end, and the energy output line pair is open at the output end. Energy that moves to the output end of the directional coupler 5a cannot escape, but is held as if in a memory cell. When the signal transmission line 1 is comparatively short, the structure in the first embodiment is ideal.

The second embodiment, having the double-coupler configuration shown in FIG. 2, minimizes the flow of charge into the signal transmission line 1, which is desirable when the signal transmission line 1 is comparatively long. The directional coupler 5b at the transmitting end of the signal transmission line 1 blocks the dc component from both the signal transmission line 1 and the receiving circuitry, passing only the wideband ac component to the signal transmission line as electrical energy. The signal transmission line 1 transmits an electromagnetic wave in one direction, but does not transport charge. The receiver 4 is held in a charged state, analogous to the memory cell mentioned in the first embodiment.

The third embodiment, having the double-coupler configuration with a terminating resistor shown in FIG. 3, operates the receiver 4 by signal transition energy alone. The terminating resistor 6a connected across the output end of the energy output line pair of the directional coupler 5c avoids energy collisions by allowing a brief discharge to take place when the logic level of the signal inverts (following the transition, the signal energy is converted uniformly to heat).

The fourth embodiment, having a single coupler at the transmitting end as shown in FIG. 4, is a simplified version of the third embodiment, applicable when the signal transmission line 1 approaches light-speed performance. The directional coupler 5b, which is connected to the transmitting end of the signal transmission line 1, is a high pass filter with a smooth passband from, for example, one hundred megahertz to several times ten gigahertz.

When the signal output from the driver is transmitted on the signal line in the signal transmission line 1, a complementary signal is transmitted on the ground line in the signal transmission line 1 (see References 1a, 1b, and 2) with an impedance of, for example, fifty to seventy-five ohms (50 Ω to 75 Ω). This is true both in the first, second, third, and fourth embodiments, in which the driver 2 has a single inverter stage as in the conventional circuit in FIG. 8, and in the fifth embodiment, in which the driver 12 has a differential structure.

Although the driver 2 or 12 uses the substrate ground (reference ground) of the LSI chip, during signal transmission, the ground line leading away from the driver is electromagnetically coupled with the signal line, and the complementary signal it carries behaves independently of the reference ground. This follows from the physics of electromagnetic wave transmission, not from lumped constant circuit theory. At the receiving end of the signal transmission line 1, the signal transmitted on the signal line and the complementary signal on the ground line are differential signals that can be received by a differential receiver.

Although transmission noise can be avoided if the signal transmission line 1 is electromagnetically closed, it may be desirable for the differential input MOS transistors N3 and N4 in the receiver 4 or 14 to be disposed in a well structure that is not connected to the substrate ground (that is, a well electrically isolated from the substrate ground). Then even if the received signal includes common mode noise and is offset from the reference potential, since MOS transistors N3 and N4 are disposed in the same well structure, they can detect the correct potential difference and the signal can be received properly, regardless of its relation to the ground level.

If the differential pair of input MOS transistors N3 and N4 are placed in a well that is not connected to the substrate ground, however, large signal swings may lead to latch-up. This can be prevented by connecting the well to the drain of the current control MOS transistor N2, as indicated by dotted lines in FIGS. 1 to 5, so as to provide the differential input MOS transistors N3 and N4 with a suitable back gate bias. This connection is unnecessary if the chip has a structure in which latch-up does not occur, such as a silicon-on-insulator (SOI) structure.

When power (Vdd) is supplied through a line pair including a ground line, e.g. through the power-ground transmission line pair 3 shown in FIGS. 1 to 5, if the on-resistance of the transistors in the inverter in the driver 2 or 12 is in the range from 500 Ω to 1 kΩ and the characteristic impedance $Z_0$ of the signal transmission line 1 is 50 Ω, the signal amplitude $V_s$ is bounded by the following inequalities:

$$(50/550) \times Vdd \geq V_s \geq (50/1050) \times Vdd \qquad (5)$$

The receiver 4 or 14 is a sense amplifier that detects the level of the signal amplitude $V_s$. A differential amplifier structure as shown in FIGS. 1 to 5 is preferable.

If the (digital) pulse signal has a frequency of 10 GHz, the rise time ($t_r$) and fall time ($t_f$) of the signal voltage are thirty-five picoseconds (35 ps) at maximum, and are generally shorter than 35 ps. These high-speed voltage changes are part of the wide band of higher harmonics that are transmitted through the directional coupler, which has a filter function that blocks the dc component of the signal. Even if the pulse signal is a control signal having a large dc component, such as an enable signal or acknowledge signal, or a column address strobe (CAS), row address strobe (RAS), or chip select (CS) signal, the higher harmonics that pass through the coupler provide enough electrical energy to charge the gates of the transistors in the sense amplifier forming the receiver, so that the pulse signal can be received and then latched in the next-stage latch circuit F1 (shown in the receiver 14 in FIG. 5).

The direct connection of a resistor such as a pull-up resistor 19 or terminating resistor 20 to the receiving end of a transmission line as in the conventional circuits in FIGS. 9A and 9B causes a control signal having a large dc component to consume current continuously, which is undesirable in an integrated circuit chip that is basically a lumped constant circuit. Although a terminating resistor is necessary to prevent reflection of higher harmonics with wavelengths shorter than the line lengths indicated in FIG. 7, there is no need to convert the extra dc component into thermal energy. This is the basic principle of the present invention, and is the reason why a coupler that blocks the dc component is inserted.

In the embodiments of the present invention, to transmit digital signals at electromagnetic wave speed, the signal transmission line 1 itself, the differential couplers 5a, 5b, and 5c, the terminating resistors 6a and 6b, and all other parts of the circuit structure from the output interconnections of the transistors in the driver 2 or 12 to the input interconnections of the transistors in the receiver 4 or 14, preferably including the gate electrodes of the receiver input transistors N3 and N4, are metallic. Polycrystalline semiconductor resistors and signal lines should not be used, because even when a saturated electric field is impressed, the carrier mobility in a polycrystalline semiconductor is only about fifty thousand meters per second ($5 \times 10^4$ m/s), three orders of magnitude less-than the speed of an electromagnetic wave.

The embodiments of the present invention also maintain the transmission line structure in all signal-line elements from the output interconnections in the driver 2 or 12 to the input interconnections in the receiver 4 or 14, preferably including the gate electrodes of the receiver input transistors N3 and N4.

Figure 10:
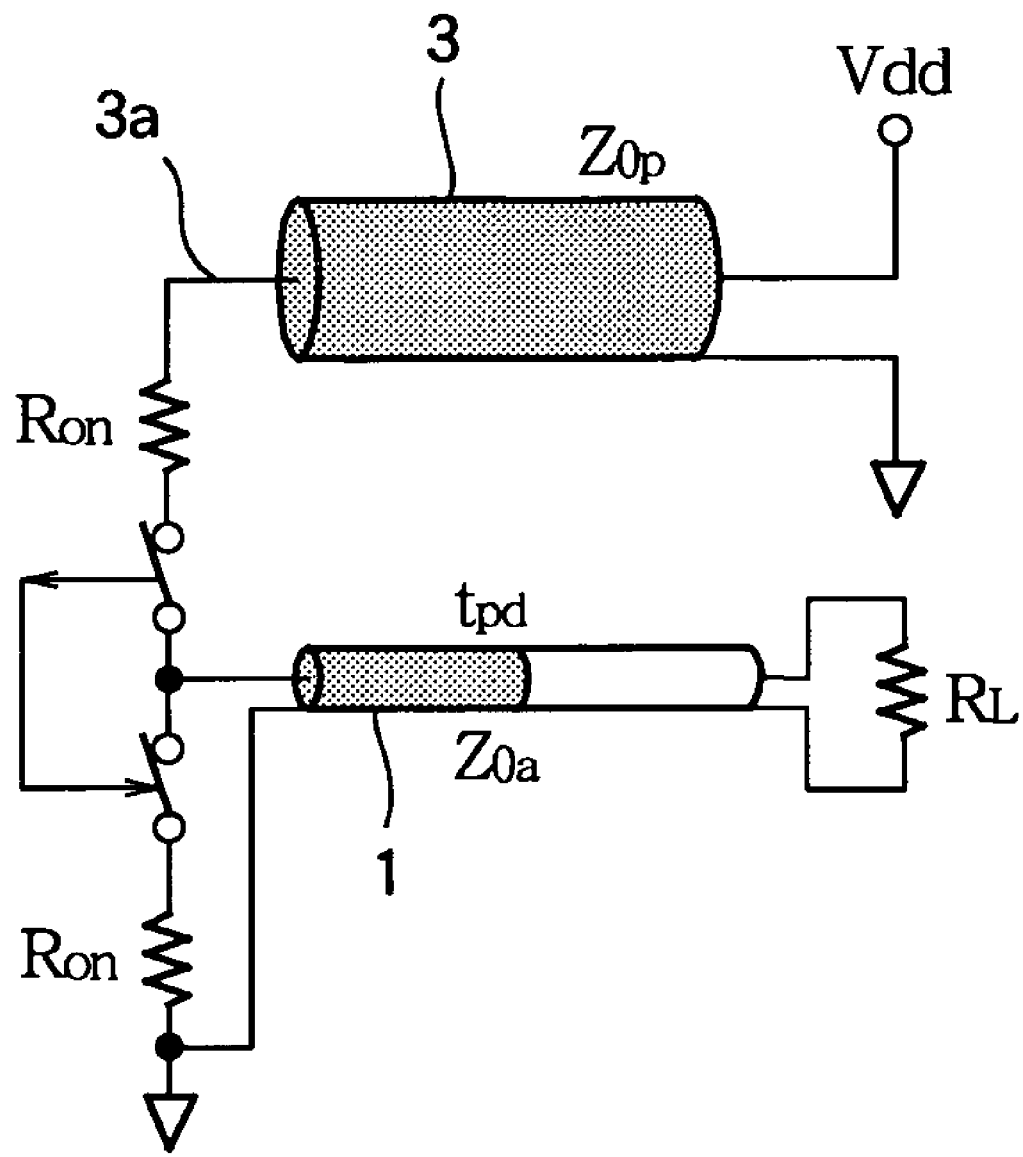
FIG. 10 is a schematic diagram illustrating transport of electrical energy.

FIG. 10 is a schematic diagram illustrating the transport of electrical energy (moving charge) in a transmission line 1 with a termination resistor but no directional couplers. The driver transistors are represented as switches in series with resistors having a resistance $R_{on}$ (the on-resistance). At the instant when the driver transistor connected to the power supply Vdd is turned on, the load seen from the power line 3a is the sum of the on-resistance $R_{on}$ of this transistor and the characteristic impedance $Z_{0s}$ of the signal transmission line, and the resulting current flow is given by the following equation (6).

$$i = Vdd/(R_{on} + Z_{0s}) \quad (6)$$

The current (i) given by equation (6) continues to flow either for the duration of time $t_{on}$ that this transistor is left on, or for the propagation delay time $t_{pd}$ on the signal transmission line 1, whichever is shorter.

When the signal energy arrives at the far end of the transmission line after the elapse of time $t_{pd}$, the load $Z_{0s}$ disappears and is replaced with the resistance $R_L$ of the terminating resistor. If the transmission line is analogous to a water pipe, the pipe is now full of water. The two loads $Z_{0s}$ and $R_L$ are equal, so the current (i) does not vary. The result is that the amount of electrical charge Q transported by the signal is controlled by the on-pulse time $t_{on}$, and is given by the following equation (7).

$$Q = i \times t_{on} \quad (7)$$

Consider next what happens if the input signal goes high while charge is still moving toward the terminating resistor according to the electromagnetic wave vector on the signal transmission line 1. The driver transistor connected to ground turns on and the driver transistor connected to the power supply turns off. As the signal level is equal to the ground level, the current (i) is zero, but within the signal transmission line 1, charge continues to move toward the terminating resistor, like water retaining its kinetic energy and continuing to flow toward the output end of a pipe even after the input end of the pipe has been disconnected. When the energy of this moving charge arrives at the terminating resistor, it is converted into thermal energy. The turning on of the transistor connected to ground does not halt this movement of charge, which continues as if the transistor connected to ground had not operated.

For the reasons described above, the circuit in FIG. 10 does not dissipate energy when the pulse signal is switched off, and consumes less energy than the conventional differential signaling circuits in FIGS. 9A and 9B. In the conventional circuit in FIG. 8, however, the movement of charge (energy) is limited to the amount Q needed to charge the load capacitance $C_L$ ($Q = C_L \times Vdd$), so the circuit in FIG. 10 consumes more energy than the conventional circuit in FIG. 8. The present invention improves the signal transmission apparatus in this respect by insertion of a directional coupler.

The power-ground transmission line pair will be explained below. The conventional circuits in FIGS. 9A and 9B operate as current switches. If they operate ideally, direct current flows continuously and ground bounce does not occur, which is the reason why these circuits are considered to be suitable for high-speed signal transmission. In actual switching, however, the total capacitance between the drain and source of the switching transistor and between the drain and the substrate ground is charged or discharged, causing an extremely abrupt current spike. This cannot be prevented by a bypass capacitor, because of the inductance of the bypass capacitor.

If the pulse signal frequency in the circuits in FIGS. 9A and 9B is 20 GHz, the rise time ($t_r$) and fall time ($t_f$) must be equal to or less than 17.5 ps. If the supply voltage Vdd is 1 volt (V) and $R_{on} + R_L = 950 \, \Omega + 50 \, \Omega$, the current (i) is one milliampere (1 mA), and the voltage swing is 0.1 V. Even if a bypass capacitor with a comparatively small inductance such as one hundred picohenries is used ($L_0 = 100$ pH), the power supply voltage drop $V_{drop}$ is given by the equation below.

$$V_{drop} = L_0 \times \left(\frac{di}{dt}\right) \quad (8a)$$

$$= 100 \text{ pH} \times 1 \text{ mA}/17.5 \text{ ps}$$

$$= 5.7 \text{ mV} \quad (8b)$$

This means that ten drivers cannot be powered from the same power source without causing a voltage drop of 57 mV on the power line. If current switch skew and the differing performance characteristics of the NMOS and PMOS transistors used in an LVDS system are also factored in, the ground bounce becomes unmanageable.

In the present invention, power is supplied from a power-ground transmission line pair 3 having essentially no stray capacitance and inductance but having a characteristic impedance $Z_{0p}$, as shown in FIG. 10.

The maximum permissible current $I_{max}$ that can be supplied from a power-ground transmission line pair with a characteristic impedance $Z_{0p}$ is given by the equation below.

$$I_{max} = Vdd/Z_{0p} \quad (9)$$

If the power supply voltage Vdd is 1 V and the characteristic impedance $Z_{0p}$ is 25 Ω, a current $I_{max}$ of 40 mA can be supplied instantaneously, with no associated frequency characteristic.

Differing from water, which cannot instantaneously start moving at a given speed in a full pipe, electromagnetic waves always propagate at the speed of light ($1.5-3.0 \times 10^8$ m/s). Since the carrier mobility in a transistor drawing electrical charge in order to charge a capacitance is some three orders of magnitude slower ($5 \times 10^4$ m/s in a saturated electric field), for all practical purposes the above current $I_{max}$ is available instantaneously.

At the instant this current is obtained, however, the question of inertia arises. This question can be ignored only if the situation is analogous to a water supply system in which the branch pipes that lead to individual dwellings are so much smaller than the water main from which they branch out that the flow of water in the main is essentially undisturbed.

In FIG. 10, if the on-resistance of the transistors in the inverter forming the driver is $R_{on}$, and the characteristic impedance of the signal transmission line is $Z_{0s}$, the resistive load $R_D$ (seen from the power supply), which is the sum of the resistive load of the driver and the terminating resistance, is given by the equation below.

$$R_D = R_{on} + Z_{0s} \quad (10)$$

If the on-resistance $R_{on}$ is in the range from 500 Ω to 1 kΩ, and the characteristic impedance $Z_{0s}$ is 50 Ω, the resistive load $R_D$ is in the range from 550 Ω to 1050 Ω.

If the supply voltage Vdd is 1 volt (V) and $R_D = R_{on} + R_L = 950\,\Omega + 50\,\Omega$, the current (i) is 1 mA, and the voltage swing is 0.1 V, consuming only two and a half percent (2.5%) of the maximum permissible current $I_{max}$ of 40 mA in FIG. 10. If ten drivers are driven, 25% of the maximum permissible current $I_{max}$ is consumed. Although 25% is enough to cause a detectable ground bounce, the bounce is softened by the delay caused by the transistor's limited carrier mobility, which is three orders of magnitude less than the electromagnetic wave speed, so in practice no problem occurs.

When a single power-ground transmission line pair supplies electrical energy to n signal drivers, where n is a positive integer, the characteristic impedance $Z_{0p}$ of the power-ground line pair is adequate if the following inequality is true, as noted in Japanese Unexamined Patent Application Publication Nos. 11-284126 and 2000-174505.

$$Z_{0p} < R_D/n \quad (11)$$

The present invention therefore uses a power-ground transmission line pair with a characteristic impedance adequately low to drive a resistive load equal to the sum of the on-resistance of the driver and the characteristic impedance of the signal transmission line, this power-ground transmission line pair extending from the driver to the power source circuit, or to a bypass capacitor nearby.

Figures 11A, 11B:
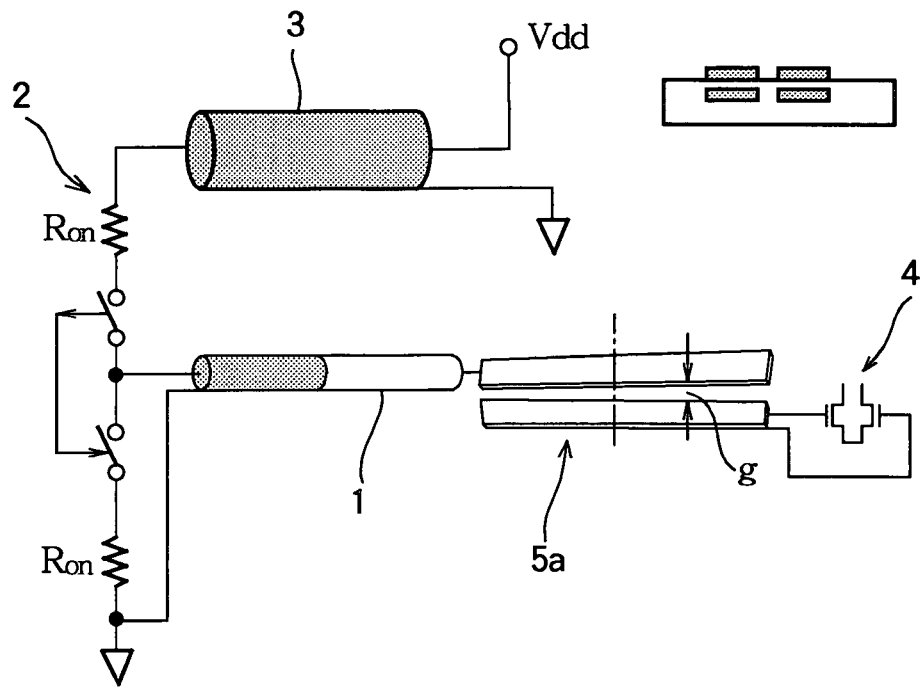
FIG. 11A is a schematic diagram illustrating the operation of a signal transmission circuit with a single directional coupler at the receiving end.
FIG. 11B is a cross-sectional view of the directional coupler in FIG. 11A.
Figures 11C, 11D:
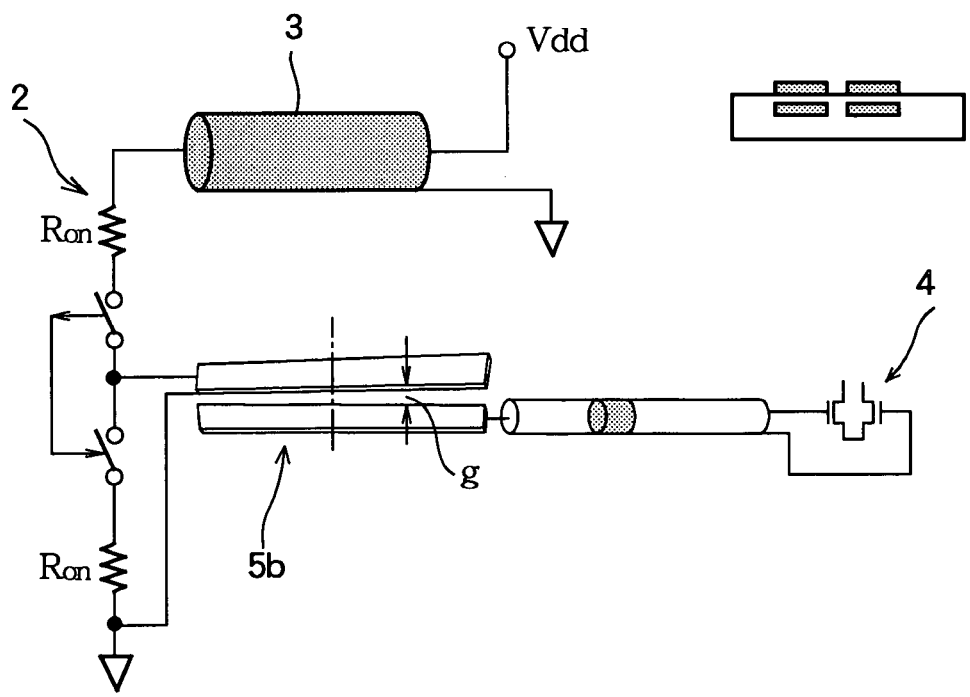
FIG. 11C is a schematic diagram illustrating the operation of a signal transmission circuit with a single directional coupler at the transmitting end.
FIG. 11D is a cross-sectional view of the directional coupler in FIG. 11C.

FIGS. 11A and 11C are schematic diagrams illustrating the operation of a signal transmission circuit with a single coupler at the transmitting or receiving end. The signal transmission circuit in FIG. 11A is similar in structure to the first embodiment, and differs from the signal transmission circuit in FIG. 10 by replacing the terminating resistor at the receiving end with the directional coupler 5a used in the first or second embodiment, shown in FIG. 1 or FIG. 2. The signal transmission circuit in FIG. 11C differs from the signal transmission circuit in FIG. 11A by replacing the directional coupler 5a at the receiving end with the directional coupler 5b used at the transmitting end in the second to fifth embodiments, shown in FIGS. 2 to 5.

Although the signal transmission circuit in FIG. 11A is connected to the gates of the differential receiver, its receiving end is effectively open because of the directional coupler. Although the signal transmission circuit in FIG. 11C is connected to the driver, its transmitting end is effectively open because of the directional coupler. The signal transmission circuits in FIGS. 11A and 11C differ from the conventional circuits in FIGS. 9A and 9B by consuming no dc energy.

Although a coaxial transmission line is shown as a model signal transmission line in FIGS. 11A and 11C, a stacked-pair transmission line, strip transmission line, microstrip transmission line, slot line, or coplanar waveguide can be used instead. Although the directional coupler is represented by stacked-pair surface-layer lines in the cross-sectional views in FIGS. 11B and 11D, other types of directional couplers can be used, including the types that will be shown as examples in FIGS. 20A and 20B.

The physical phenomena involved in a directional coupler will be explained below. An electromagnetic wave traveling on a transmission line propagates in the transverse electromagnetic mode (TEM), in which the associated electric and magnetic flux lines both extend perpendicular to the direction of propagation. In the cross-sectional diagrams of the directional couplers in FIGS. 11B and 11D, the circles indicated by the dotted lines indicate the space occupied by the electromagnetic waves, that is, the effective spatial spread of the electric and magnetic flux lines. (In theory, the electric and magnetic flux lines spread infinitely, but only a negligible amount of energy is present outside the indicated circles).

An electromagnetic wave propagates in air at the speed of light ($c_0$), which is given by the magnetic permeability ($\mu_0$) and dielectric constant ($\epsilon_0$) of a vacuum as in the equation below.

$$c_0 = 1/\sqrt{(\mu_0 \epsilon_0)} = 3 \times 10^8 \text{ (m/s)} \quad (12)$$

An electromagnetic wave propagates in a dielectric material with the velocity (v) given by the relative magnetic permeability ($\mu_r$) and relative dielectric constant ($\epsilon_r$) of the dielectric material as in the equation below.

$$v = c_0/\sqrt{(\mu_r \epsilon_r)} \quad (13)$$

If $\epsilon_r$ is four and $\mu_r$ is unity, $v = 1.5 \times 10^8$ (m/s).

The signal input to a directional coupler starts out as a TEM wave, but as the wave propagates, the difference between the propagation velocity in air ($c_0$) and the propagation velocity in the dielectric material (v) distorts the transverse electromagnetic propagation mode. Initially, because of the strong coupling in a stacked line pair, the electromagnetic field is effectively confined to a range such that crosstalk to the adjacent line pair can be ignored, but as the propagation mode becomes distorted, the coupling is weakened and the effective electromagnetic field spreads out, facilitating the transfer of electromagnetic energy to the adjacent stacked pair of lines.

Figure 12A:
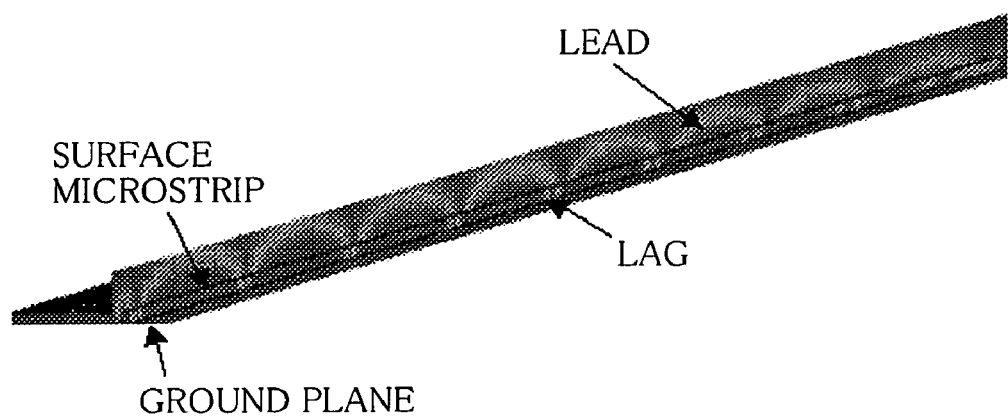
FIGS. 12A and 12B are simulated cross-sectional perspective views of parallel microstrip transmission lines illustrating distortion of the transverse electromagnetic propagation mode (TEM)
Figure 12B:
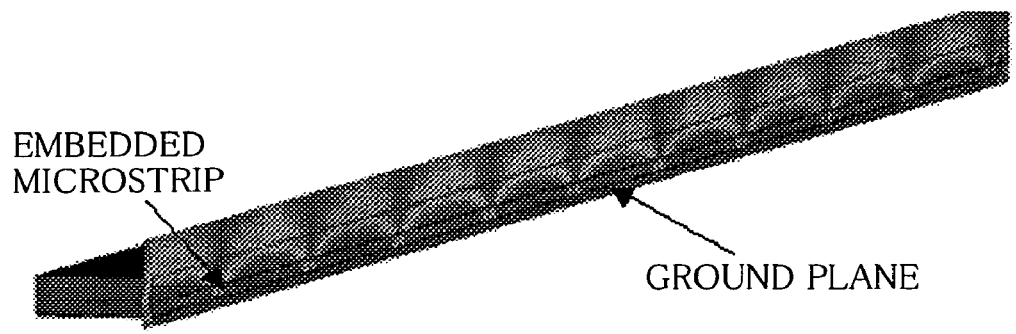
Figure 12C:
FIG. 12C illustrates the electric field scale used in FIGS. 12A and 12B.
Figure 13A:
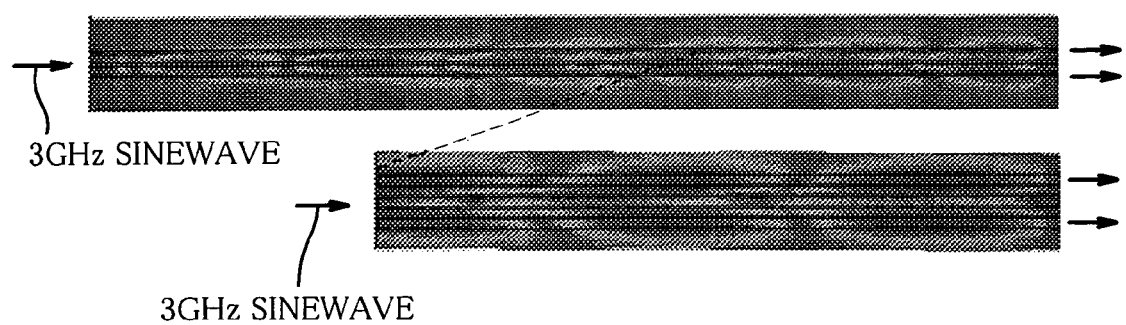
FIGS. 13A and 13B are simulated top views of parallel microstrip transmission lines illustrating TEM distortion.
Figure 13B:
Figure 13C:
FIG. 13C illustrates the electric field scale used in FIGS. 13A and 13B.

FIGS. 12A and 12B are simulated cross-sectional perspective views, and FIGS. 13A and 13B are simulated top views, of three parallel microstrip transmission lines illustrating the distortion of the transverse electromagnetic propagation mode. The microstrip transmission lines in FIGS. 12A and 13A have a surface-layer structure comprising a microstrip formed on the surface of a dielectric layer above a ground plane. This structure is generally similar to the structure in FIGS. 11B and 11D. The microstrip transmission lines in FIGS. 12B and 13B have an embedded structure, in which the microstrip is embedded in the dielectric material. A sinewave signal with a frequency of 3 GHz is input to the middle one of the three transmission lines. FIGS. 12A and 12B show the field strength distribution seen in cross sections through the middle transmission line. FIGS. 12C and 13C indicate the electric field scale.

In a surface-layer microstrip transmission line, the field distribution propagates faster and hence further in air than in the dielectric material, as seen in FIG. 12A. In an inner-layer microstrip transmission line, the propagation mode is maintained, as seen in FIG. 12B.

In the surface-layer structure, the electromagnetic energy of the 3-GHz sinewave signal input to the middle one of the three lines spreads out, causing a complete transfer of field energy to the two adjacent lines within a length of 200 mm, as seen in the enlarged view at the bottom in FIG. 13A. In the embedded structure, no transfer of field energy to the adjacent lines occurs, as seen in FIG. 13B.

Figure 14A:
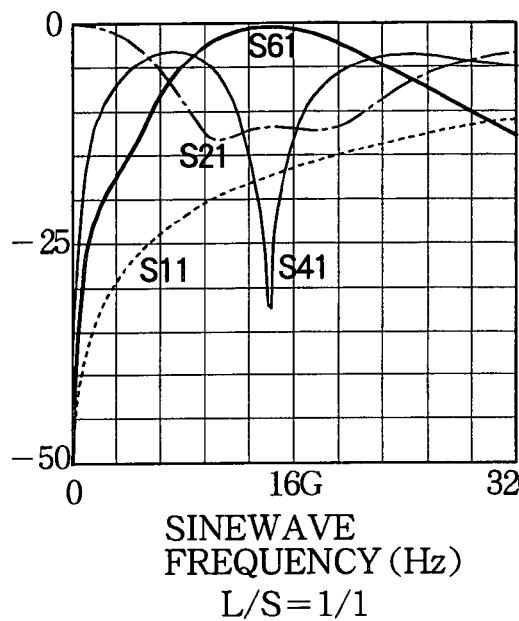
FIGS. 14A, 14B, and 14C are graphs illustrating transfer of electromagnetic energy to adjacent lines in a stacked-pair transmission line by using scattering parameters (S-parameters)
Figure 14B:
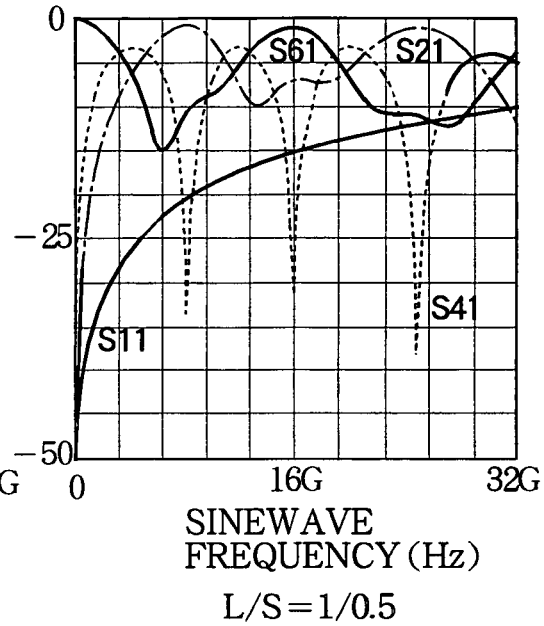
Figure 14C:
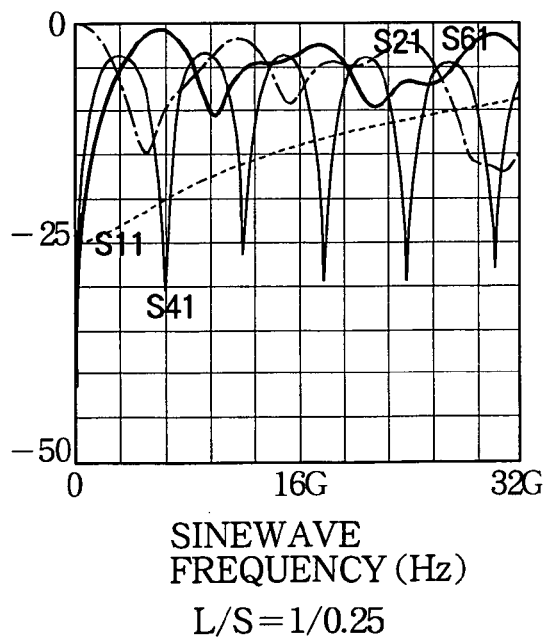

FIGS. 14A, 14B, and 14C are graphs illustrating the transfer of electromagnetic energy between stacked-pair transmission lines by using scattering parameters (S-parameters). In FIG. 14A, the line width L is equal to the space S between adjacent transmission lines. In FIG. 14B, L/S=1/0.5. In FIG. 14C, L/S=1/0.25. A sinewave signal is input to an outer one of three stacked-pair transmission lines. S11 is the reflection characteristic of the electromagnetic wave energy on this outer line, S21 is the transmission characteristic of the electromagnetic wave energy on this outer line, S41 indicates the crosstalk energy at the far end of the adjacent middle line, and S61 indicates the crosstalk energy at the far end of the other outer line. The values of these parameters are indicated in negative units such as decibels on the vertical axis; frequency in gigahertz is indicated on the horizontal axis.

The smaller the space between adjacent lines is, the lower the frequency at which the crosstalk energy (S41 and S61) exceeds the transmitted energy (S21) becomes. The crosstalk characteristics then continue to vary above and below the transmission characteristic in a repeated cyclic pattern that depends on the frequency. The spacing between adjacent lines is therefore closely related to the frequency characteristic of the energy coupling between the lines, and a given coupling characteristic can be reproduced in a short line length if the spacing is made extremely small.

The present invention uses a directional coupler as a means to satisfy what is literally a high-pass-filter condition by blocking the frequency band from dc to 100 MHz, where there is comparatively-little noise oscillation, while enabling the transfer of energy at all higher frequencies. The directional coupler therefore operates as a wideband coupler.

Since the characteristics of adjacent line pairs differ with frequency as shown in FIGS. 14A, 14B, and 14C, it is necessary to set appropriate conditions for the directional coupler, such as the length of the energy input line pair and the energy transmitting line pair, the gap between the adjacent line pairs (the gap g in FIGS. 11A and 11C), and the dielectric constants of the dielectric materials in which the line pairs are disposed.

One way to provide a wideband directional coupler as described above is to make the gap (g) variable as shown in FIGS. 11A and 11C. Wideband coupler structures other than the graded gap structure in FIGS. 11A and 11C are also possible.

If a directional coupler is designed to function as a wideband coupler, in the signal transmission circuit with the directional coupler at the receiving end in FIG. 11A, the receiving end of the signal transmission line is actually the open end of the energy input line pair in the directional coupler. The signal transmission line is therefore indirectly terminated; dc power is not consumed, but all energy of the ac components is transferred to the adjacent energy transmitting line pair in the directional coupler, and either stored in this adjacent line pair or dissipated in a terminating resistor, without causing complex and troublesome reflection. In the signal transmission circuit with the directional coupler at the transmitting end in FIG. 11C, all energy of the ac components is transferred through the directional coupler to the signal transmission line, but the dc component is blocked, so that dc power is not consumed and the ac components alone are transmitted on the signal transmission line. In either case, a major effect is that power is not consumed by direct current flow. Moreover, a full signal amplitude can be obtained, even for a control signal that remains on or off for a long period.

In comparison with the wideband coupler of the present invention, a high pass filter realized as an LC circuit passes only a narrow band of frequencies. If a wideband high pass filter equivalent to the present wideband coupler were to be realized as an LC circuit, the circuit would have to be very large in scale. Moreover, the higher the frequency of the pulse signal is, the more difficult the design of the LC circuit becomes. For a pulse signal with a frequency of 20 GHz, for example, it would be almost impossible to implement a wideband high pass filter in an LC circuit.

Figure 15:
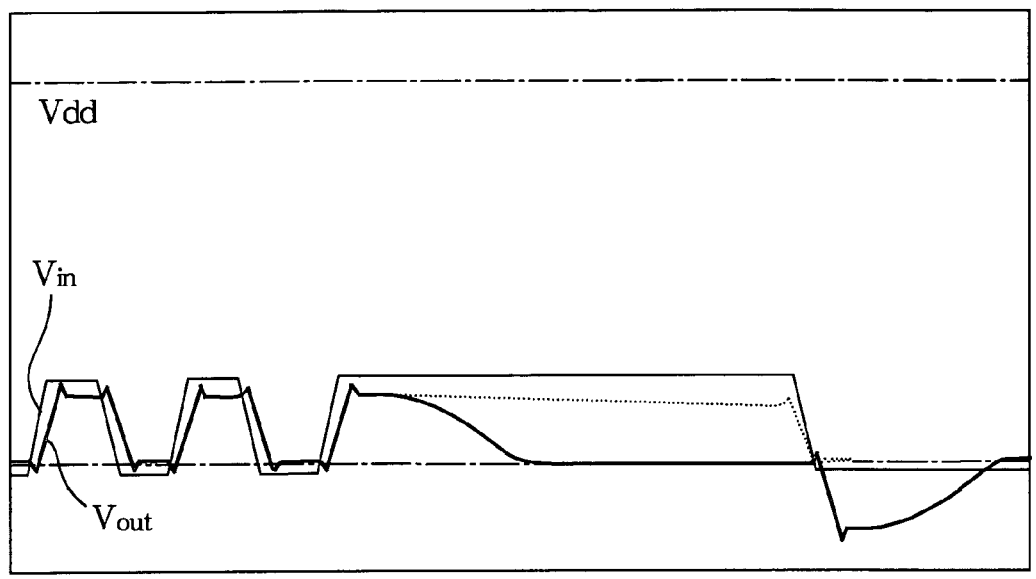
FIG. 15 is a model waveform diagram illustrating signal transmission in the embodiments of the invention.

FIG. 15 is a model waveform diagram illustrating signal transmission in the embodiments of the present invention. $V_{in}$ is the input signal; $V_{out}$ is the output signal. The dotted line indicates the waveform of the output signal $V_{out}$ when no terminating resistor is present, as in the first or second embodiment; the solid line is the waveform when a terminating resistor is present, as in the third or fourth embodiment.

The signal amplitude, which is determined by the on-resistance of the transistors in the driver, is lower than the power supply voltage Vdd. For a clock signal or similar signal, the waveform of the transmitted signal becomes the waveform of the received signal. When the hold time of the transmitted signal is comparatively long, however, the waveform of the received signal descends along an attenuation curve to zero volts, following the RC integrating attenuation characteristic of the coupler, because the dc component does not pass through the coupler and the energy of the higher harmonics passing through the coupler is dissipated in the terminating resistor, if present. Since the received signal is attenuated slowly, there is no undershoot; the output of the differential amplifier in the receiver does not invert. At the end of the pulse signal, the received signal may go negative, and the differential sense amplifier, which does not require a reference potential, may invert, but if a latch circuit (such as the latch circuit F1 in FIG. 5) is connected as an output stage to the differential sense amplifier, the signal can be detected correctly irrespective of the length of the hold time.

If the signal transmission line is comparatively long, direct current flows for the duration of the propagation delay time $t_{pd}$, as described above. In the circuit in FIG. 10, the entire flow of electrical charge is dissipated in the terminating resistor. In the circuit in FIG. 11A, however, only the transition energy of the signal is discharged to the adjacent line pair by the coupler; the electrical charge representing the dc component accumulates in the signal transmission line and cannot discharge until the driver switches back to the state in which the NMOS transistor can conduct the charge to ground. The dc component then flows backward and is output to ground. This discharge differs from the discharge of the load capacitance $c_L$ in the conventional circuit in FIG. 8; the dc component is discharged as a pulse with a duration equal to the propagation delay time $t_{pd}$.

In the circuit in FIG. 11A and the first embodiment in FIG. 1, if the propagation delay time $t_{pd}$ is longer than half the clock period, charging of the signal transmission line starts before discharging of the dc component finishes, causing the signal to be distorted as if by multiple reflections. Accordingly, the first embodiment can be used if the following inequality is true.

$$t_{pd} < \tfrac{1}{2} \text{ clock period} \tag{14}$$

The circuits in the second to fourth embodiments in FIGS. 2 to 4 are designed to avoid fully charging the signal transmission line. Only the transition energy of the signal is transferred onto the signal transmission line, where it propagates to the receiver at electromagnetic-wave speed; dc electrical charge is not stored in the signal transmission line even if the propagation delay time $t_{pd}$ is greater than half the clock period, as in the circuit in FIG. 11C. All this energy is transferred through the coupler, or dissipated in the terminating resistor, so current does not flow through the NMOS transistor on the ground side in the driver, just as current does not flow through the NMOS transistor in FIG. 10.

For a clock signal or similar signal, the waveform of the received signal in the second to fourth embodiments is the same as in the first embodiment, as shown on the left side in FIG. 15. When the hold time of the transmitted signal is comparatively long, the waveform of the received signal follows the dotted line in the second embodiment (as in the first embodiment) or the solid line in the third or fourth embodiment. The dotted-line waveform in FIG. 15 thus applies when no terminating resistor is present (as in the first or second embodiment); the solid-line waveform indicates the presence of a terminating resistor (as in the third or fourth embodiment).

It is unnecessary to match the impedance of the terminating resistor 6a in the third embodiment in FIG. 3 to the output impedance of the directional coupler 5c, but it is necessary to select a resistance value that enables a long pulse attenuation curve to be treated as an RC integrating curve.

Since the NMOS transistor in the driver in the second to fourth embodiments does not conduct current, it may seem that this transistor could be eliminated, but in that case the flow of direct current could gradually increase the circuit bias and the driver might eventually cease operating, so this NMOS transistor is required. It is possible, however, to use two NMOS transistors to form an inverter in the driver, as in the fifth embodiment in FIG. 5.

Although NMOS transistors N11 and N12 operate in synchronization with an input differential signal in the fifth embodiment in FIG. 5, there is no need for them to operate complementarily. The different drain voltages of NMOS transistors N11 and N12 cause a difference in their on-resistance, even if their dimensions are the same, but the difference in the on-resistance presents no problem, because the purpose of NMOS transistor N12 is to provide a reference to ground.

Since the on-resistance of the driver 12 may be fairly high, no further current-limiting measures may be necessary, but if the on-resistance of the transistors in the driver 12 is low, a resistor R10 may be inserted on the power-supply side as shown in FIG. 5.

Although the sense amplifier in the receiver 14 must be designed to detect small signal swings, this is possible within the realm of ordinary device design. The dimensions of the directional couplers 5b, 5c also enable them to be formed by use of on-chip interconnection technology, as described below.

The fifth embodiment in FIG. 5 includes NMOS varactors B1 and B2, which pump the source-drain capacitance of the driver NMOS transistors N11 and N12 up and down. This capacitance must be charged or discharged at transitions of the input signals to NMOS transistors N11 and N12. The ability of the power supply to supply adequate current also implies the ability to generate an abrupt charge or discharge current spike at these transition points, possibly leading to electromagnetic interference (EMI). NMOS varactors B1 and B2 solve this EMI problem, and also reduce power consumption by recycling charge. The insertion of NMOS varactors is disclosed in Japanese Unexamined Patent Application Publication No. 2002-124635.

Returning from the above discussion of couplers, receivers, and drivers to the transmission line itself, the transverse electromagnetic mode (TEM) in a transmission line will be explained below, following the classical theories of Coulomb, Gauss, Ampere, Faraday, and Maxwell. The description of electromagnetic waves in terms of electric charge may not be completely valid; it was Einstein who pointed out that Maxwell's equations are compatible with the special theory of relativity, and for electromagnetic waves propagating in space that is true. Transmission line phenomena, however, should be explained by the behavior of photons, involving plasmons and magnons.

Figures 16A, 16B:
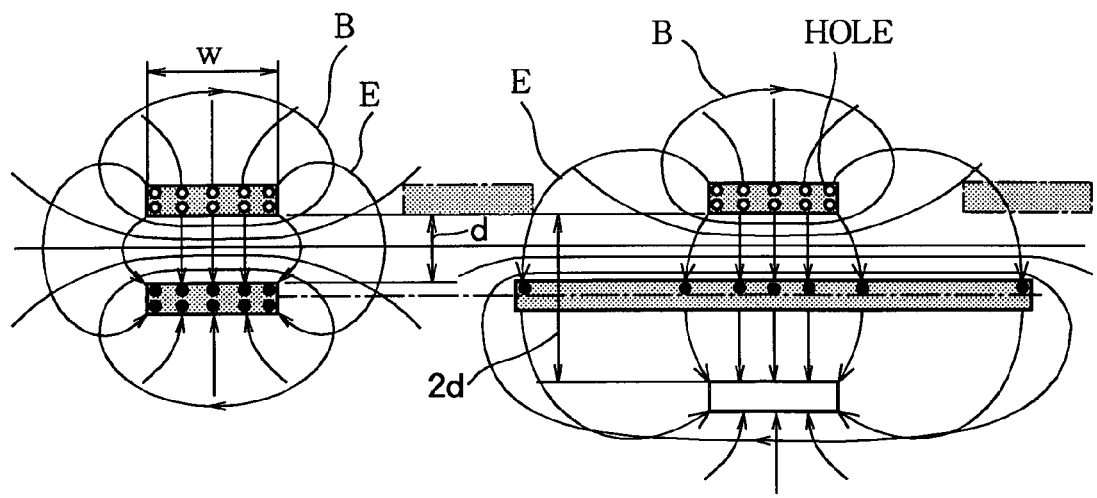
FIG. 16A is a cross-sectional view of a stacked-pair transmission line, illustrating TEM flux lines.
FIG. 16B is a cross-sectional view of a microstrip transmission line, illustrating TEM flux lines.
Figure 17A:
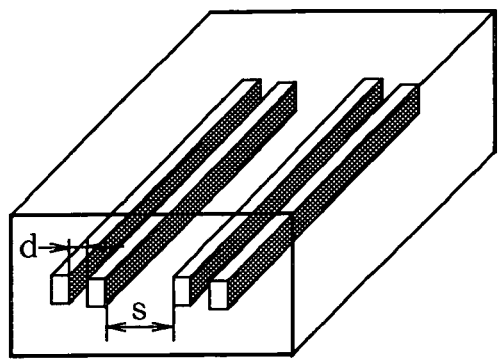
FIG. 17A shows a cross-sectional perspective view of pair-coplanar transmission lines.
Figure 17B:
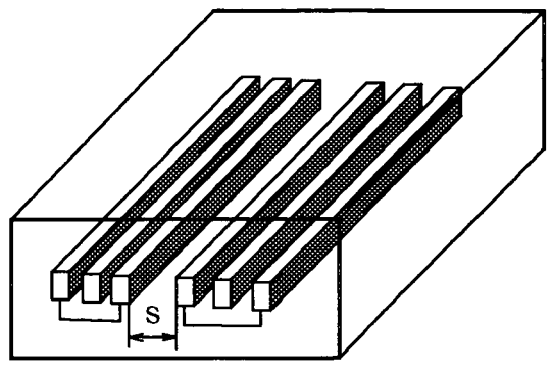
FIG. 17B shows a cross-sectional perspective view of guarded coplanar transmission lines.
Figure 17C:
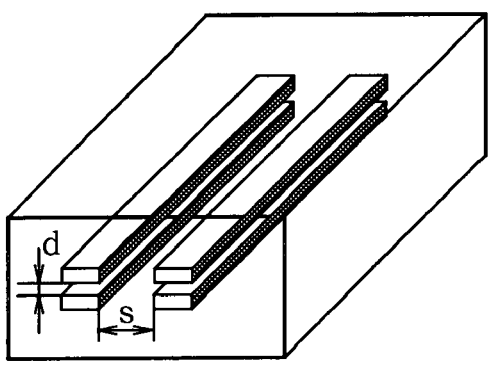
FIG. 17C shows a cross-sectional perspective view of stacked-pair transmission lines.
Figure 17D:
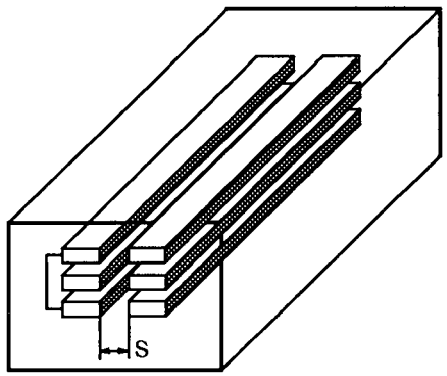
FIG. 17D shows a cross-sectional perspective view of guarded stacked-pair transmission lines.

FIGS. 16A and 16B are cross-sectional views of a stacked-pair transmission line and a microstrip transmission line with electric flux lines E illustrating the transverse electromagnetic mode. In the cross-sections of the transmission lines, circles indicate holes (positive charges) and filled dots indicate electrons (negative charges). The electric flux lines E start from the positive charges and always terminate at one of the negative charges.

The electric flux lines E are most densely distributed on the two facing sides of the paired lines, where the positive and negative charges attract each other by Coulomb force, and are sparsely distributed on the opposite sides, where they extend infinitely into space. The shorter the distance between the facing sides is, the stronger the attractive force becomes, and the higher the density of the electric flux becomes.

If the electric charges bound by these flux lines move synchronously in the direction into the paper, that is, if current flows, magnetic flux lines B are generated. The magnetic flux lines B loop around the line of current flow, the loops being oriented clockwise around the flow of positive charge, or counterclockwise around the flow of negative charge. Between the facing sides of the paired lines the magnetic flux lines B are oriented in the same direction and reinforce each other; the shorter the distance between the facing sides is, the stronger this effect becomes. On the opposite sides, the magnetic flux lines B have a natural spatial distribution that extends to infinity. The electric and magnetic flux lines are generated in such a way that they always intersect at right angles. In the central space between the two lines, the electric vector extends vertically downward and the magnetic vector extends horizontally leftward.

The transverse electromagnetic mode is so called because the electromagnetic field links charges in a plane perpendicular to the direction of current flow, as already noted in the above description of the physics of a directional coupler. The spread of the electromagnetic field is a spread of energy, and signal energy (the product of voltage times current) propagates while maintaining this spatial spread. If only the cross section of the effective spread of electromagnetic energy is taken into account, as shown in FIGS. 16A and 16B, the shorter the distance (d) between the paired lines, the smaller the spatial spread of the electromagnetic flux lines becomes.

In a microstrip transmission line, one of the paired lines is a plane, and the negative charges attempt to spread out in this plane, but they are bound by electric flux lines E to the positive charges, so the spread is naturally limited as shown in FIG. 16B. The spread can be geometrically pictured by extending the electric flux lines toward a mirror image of the paired line disposed below the plane. The flow of negative charge in the plane creates magnetic flux lines in the shape of horizontally flattened circles, which reinforce the magnetic flux surrounding the facing line as in FIG. 16A. The potential distribution in the plane is non-uniform: potential in the part of the plane in which the negative charge flows is lower than the potential (0 V) in parts of the plane where there is no flow of negative charge. The key idea that the potentials in paired lines are mutually complementary can be understood from FIGS. 16A and 16B, as explained in references 1a, 1b, and 2.

It can be seen that the electromagnetic field spreads further in the microstrip transmission line in FIG. 16B than in the stacked-pair transmission line in FIG. 16A. When an adjacent line, indicated by dash-dot lines in FIGS. 16A and 16B, is present at a separation equal to the line width, although the adjacent line is located outside the effective electromagnetic field of the stacked-pair transmission line, the adjacent line occupies part of the effective spread of the electromagnetic field in the microstrip transmission line. When a varying electromagnetic field cuts across a wire, by Faraday's law, electromagnetic induction occurs in the wire, causing crosstalk. Although the electromagnetic field has a similar spread for a constant current (direct current), the current does not vary, so even if the electromagnetic field cuts across another wire, crosstalk does not occur. The higher the frequency is, the more serious the crosstalk problem becomes. In the present case, the wire is part of a line pair forming a transmission line.

FIGS. 17A, 17B, 17C, and 17D show cross-sectional perspective views of pair-coplanar transmission lines, guarded coplanar transmission lines (having common mode conductors on both sides), stacked-pair transmission lines, and guarded stacked-pair transmission lines (having common mode conductors above and below) as examples of transmission line structures capable of being used in an integrated circuit (IC) chip, taking the principles described in FIGS. 16A and 16B into account.

The most important feature of a transmission line structure is that there must be a well-defined pair of lines. The second most important feature is that the lines must be disposed in a homogenous dielectric material having a uniform dielectric constant, so that a pulse signal can be transmitted without the distortion of the transverse electromagnetic mode seen in a directional coupler.

If the distance between facing sides in a line pair is (d) (see FIGS. 16A, 16B, 17A, and 17C), the conductor width of the facing sides is (w) (see FIG. 16A), the conductor thickness is (t), and the distance between the two adjacent line pairs is (s) (see FIGS. 17A, 17B, 17C, and 17D), the line pairs have a well-defined structure in the above sense when the following inequality is true.

$$2wd < ts \quad (15)$$

The coupling strength in a line pair is equal to $1/(wd)^2$, and the coupling strength between adjacent line pairs is $1/(ts)^2$, Inequality (15) implies that the coupling within each line pair is more than four times as strong as the coupling between the adjacent line pairs. This may appear to allow crosstalk of up to 25% of the signal energy, which is a non-negligible amount, but the coupling is strongly anisotropic, being dominated by the coupling between facing sides, rather than isotropic as in a cylinder. The crosstalk has been determined experimentally to be less than 5%.

Figure 18:
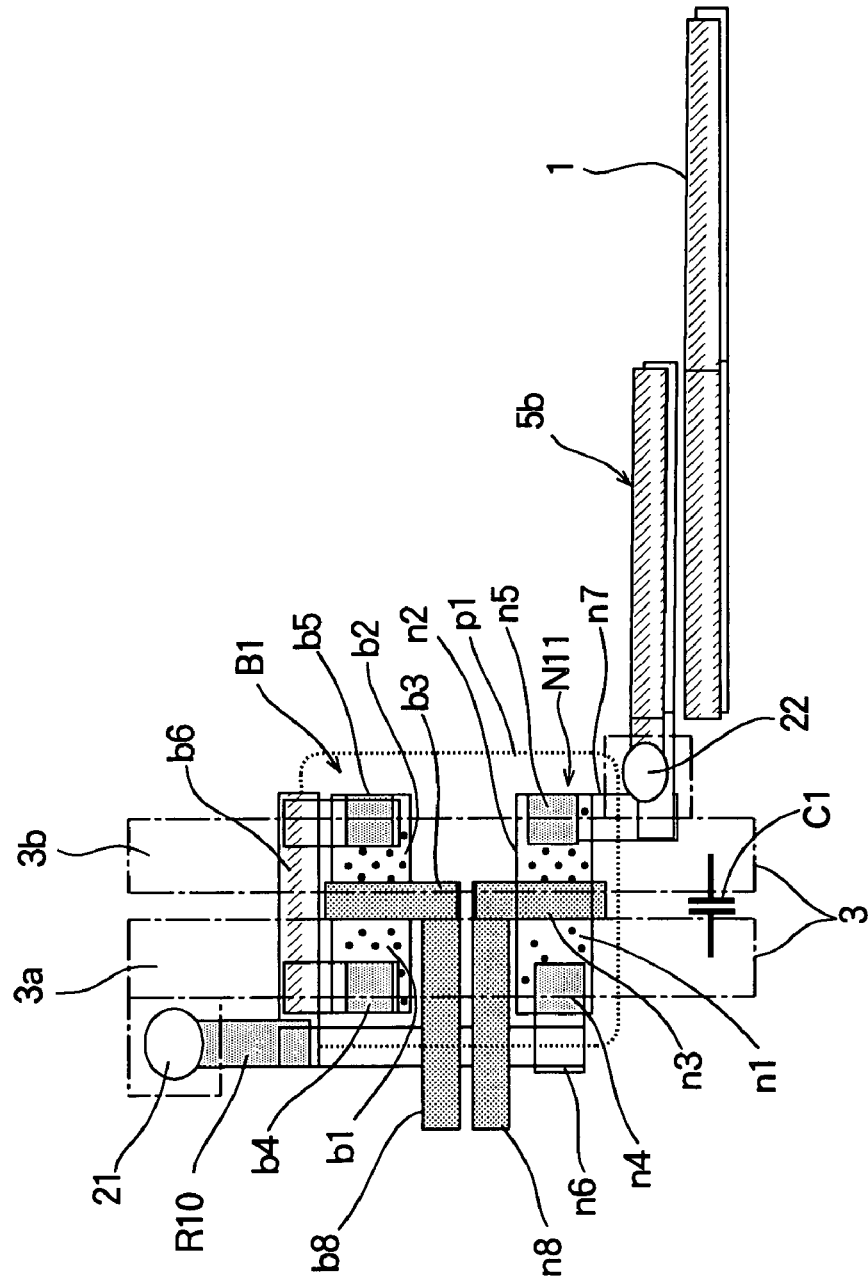
FIG. 18 shows a plan view of an exemplary driver interconnection structure in the fifth embodiment in FIG. 5.
Figure 19:
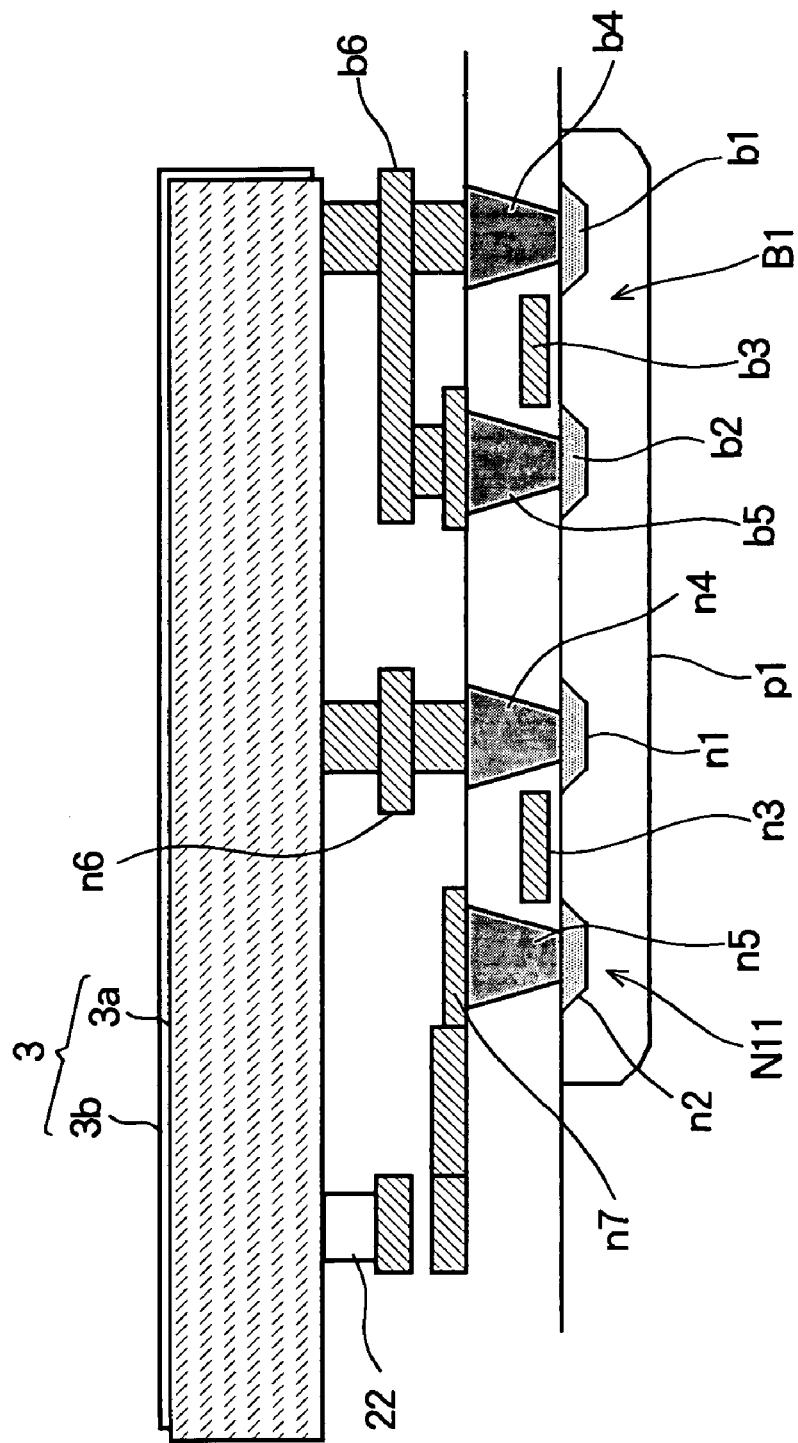
FIG. 19 shows a sectional view of the structure in FIG. 18.

As an example of the interconnection layout in the fifth embodiment, FIG. 18 shows a plan view and FIG. 19 shows a sectional view of the structure of the interconnection between a driver, which is a lumped constant circuit block, and a global signal transmission line, using the same reference characters as in FIG. 5 for similar elements. FIG. 18 shows an NMOS transistor and NMOS varactor disposed side to side; FIG. 19 shows them disposed end to end.

In FIGS. 18 and 19, a p-type region or p-well (p1) is formed in an n-type semiconductor substrate or an n-type layer of a semiconductor substrate. NMOS transistor N11 comprises an n-type drain diffusion (n1), an n-type source diffusion (n2), a gate electrode (n3), a drain contact (n4), a source contact (n5), a drain interconnection (n6), a source interconnection (n7), and a gate interconnecting line (n8). NMOS varactor B1 comprises a pair of n-type diffusions (b1 and b2), a gate electrode (b3), a pair of contacts (b4 and b5), a source-drain interconnection (b6), and a gate interconnecting line (b8).

The power-ground transmission line pair 3 in FIGS. 18 and 19 comprises a power line 3a and a ground line 3b. The power line 3a is coupled to a molybdenum resistor R10 by a contact element 21. The ground line 3b is coupled to the ground-side line of the energy input line pair in the directional coupler 5b by a contact element 22. Bypass capacitors C1 are disposed from place to place along the power-ground transmission line pair 3 (only one is shown).

In FIGS. 18 and 19, NMOS varactor B1 and NMOS transistor N11 are disposed in the same p-well (p1) so that charge can be pumped up and down.

The coplanar power-ground transmission line pair 3 comprising the power line 3a and the ground line 3b runs directly above NMOS transistor N11 and NMOS varactor B1 in the driver. Another coplanar transmission line comprising the gate interconnecting lines (n8 and b8) on which the input signal is received extends up to the gate electrodes (n3 and b3).

The output of the driver comprising the source interconnection n7 and ground line 3b forms a short stacked-pair transmission line, with the ground on top, leading to the energy input line pair in the directional coupler 5b. The stacked-pair signal transmission line 1, to which the energy transmitting line pair in the directional coupler 5b is connected, extends to the receiver.

The power line 3a, the ground line 3b, the drain contact n4, the source contact n5, the drain interconnection n6, the source interconnection n7, the gate interconnecting line n8, the contacts b4 and b5, the source-drain interconnection b6, the gate interconnecting line b8, contact elements 21 and 22, the directional coupler 5b, and the signal transmission line 1, preferably including the gate electrodes (n3 and b3), are all metallic.

In FIG. 19, the dielectric layer thickness, the conductor width, the conductor thickness, and so on of the power-ground transmission line pair and the adjacent line pair (not shown) are also selected so that inequality (15) is true. NMOS transistor N12 and NMOS varactor B2 in the driver are similar in structure to the NMOS transistor N11 and NMOS varactor B1 shown in FIGS. 18 and 19. The interconnection structure by which the input signal is received at the receiver is similar to the input signal interconnection structure in the driver as shown in FIGS. 18 and 19.

In the embodiments of the present invention, all signal-line elements, from the output transistor contacts in the driver to the gate interconnecting lines of the input transistors in the receiver, maintain a transmission line structure. Accordingly, pulse signals with a frequency several times higher than 10 GHz can be transmitted.

All signal-line elements from the output transistor contacts in the driver to the gate interconnecting lines of the input transistors in the receiver are also metallic rather than semiconductor. This allows signals to travel at electromagnetic-wave speed. Since the approach from the gate electrodes to the transmission line is short, polysilicon gate electrodes may be used, but metallic electrodes are preferable. Although a coplanar power-ground transmission line pair is used in the driver shown in FIGS. 18 and 19, other types of the power-ground transmission line pairs can also be used.

The structure of the directional coupler will be explained below. The basic principle of the structure is that the characteristic impedance seen from the input end of the directional coupler is identical to the characteristic impedance of the transmission line connected to the input end, and the characteristic impedance seen from the output end of the directional coupler is identical to the characteristic impedance of the transmission line connected to the output end. In general, if the structure of a transmission line does not vary in the direction of signal propagation, the structure can be scaled in terms of its unit length in the signal propagation direction. That is, if the same relative positions are maintained in the plane perpendicular to the propagation direction, the transmission characteristics remain the same. An exception to this rule is that a reduced conductor cross-section inevitably causes an increased dc resistance. Although the same scaling rule applies to a directional coupler, since the shape varies in the direction of signal propagation, a corresponding integral-type factor is added, but an approximate three-dimensional scaling law holds true. Since a directional coupler on an IC chip must have small dimensions, this three-dimensional scaling rule is highly effective.

Figure 20A:
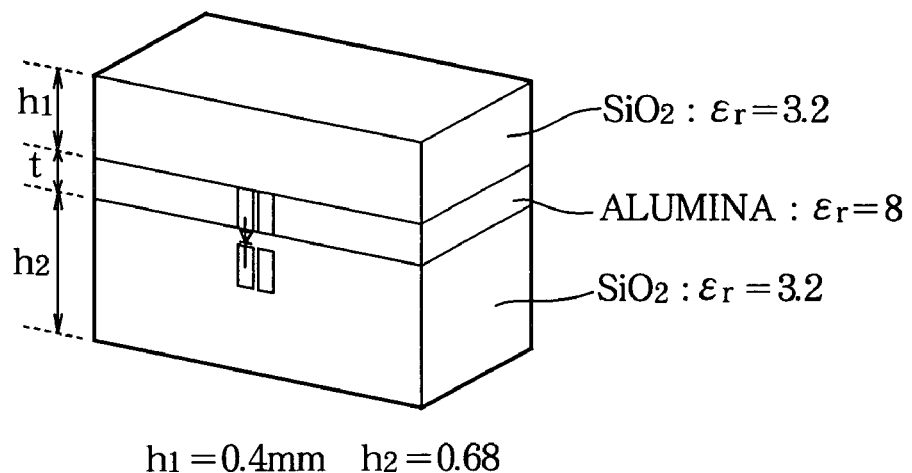
FIG. 20A is a perspective view of a directional coupler structure with an inserted layer of high dielectric material.
Figure 20B:
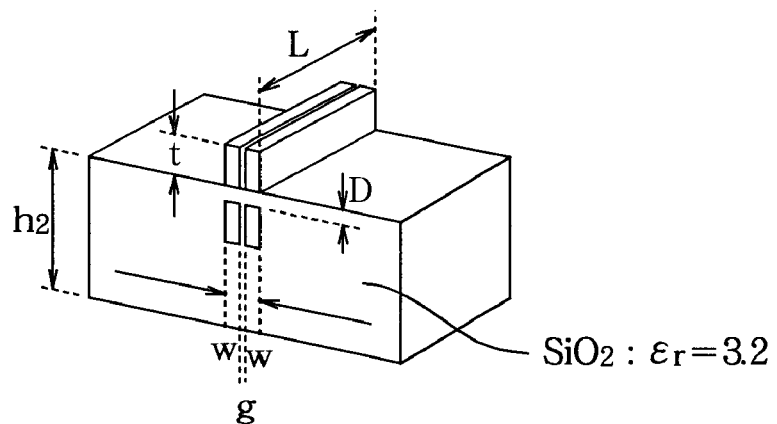
FIG. 20B is a perspective view of a stacked directional coupler structure with an air layer.
Figure 20C:
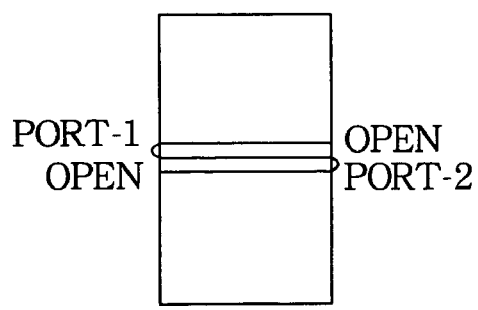
FIG. 20C is a top plan view of the directional couplers in FIGS. 20A and 20B.
Figure 22A:
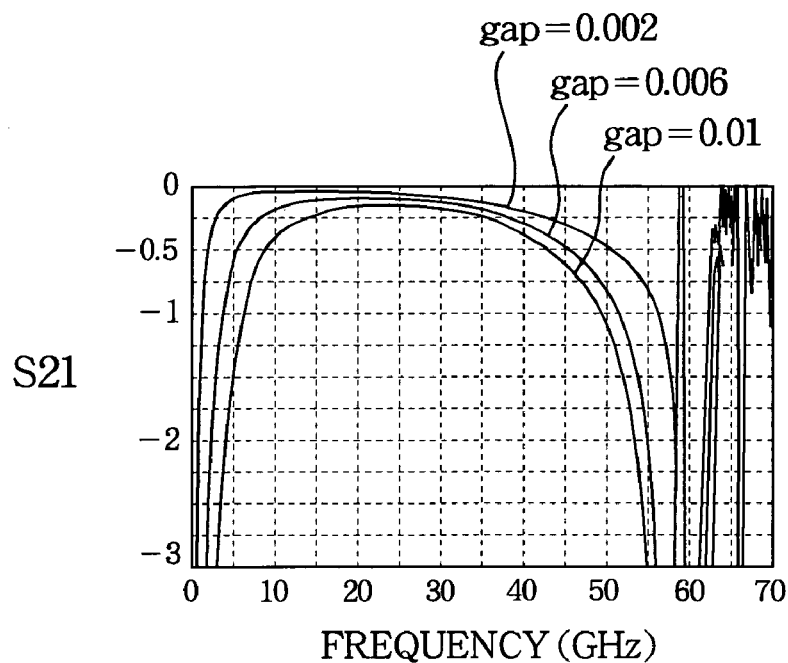
FIGS. 22A and 22B are graphs showing results of simulation of a directional coupler of the type shown in FIG. 20A.
Figure 22B:
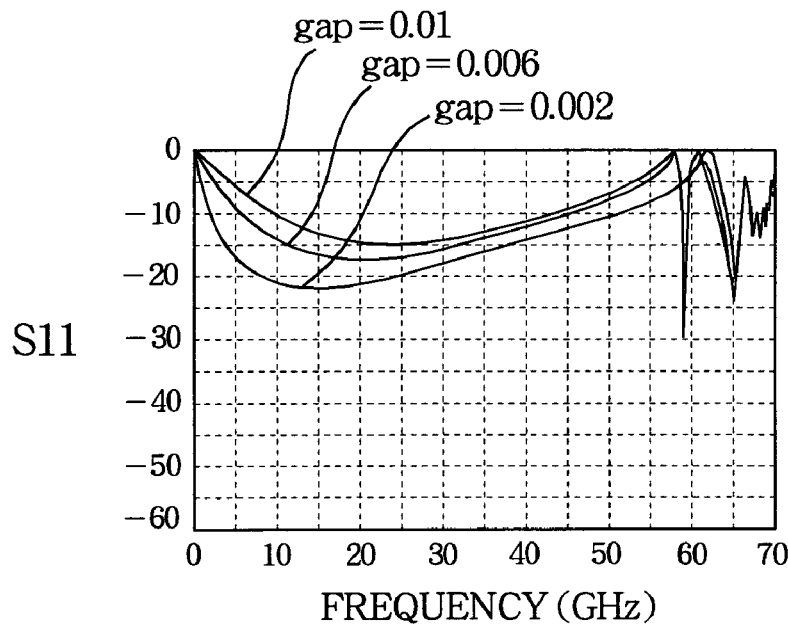
Figure 23A:
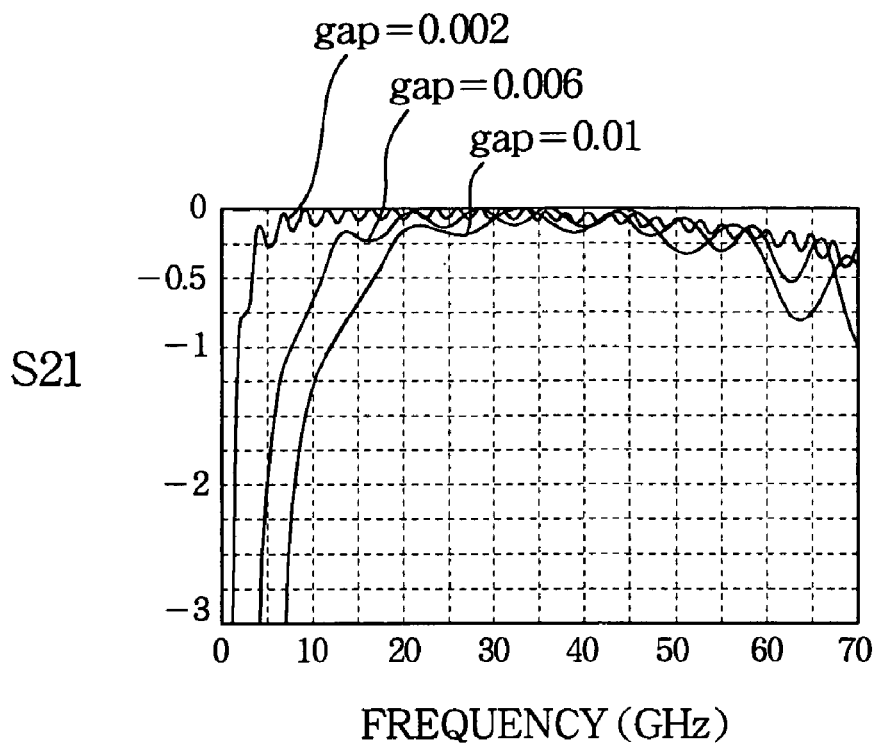
FIGS. 23A and 23B are graphs showing results of simulation of a directional coupler of the type shown in FIG. 20B.
Figure 23B:
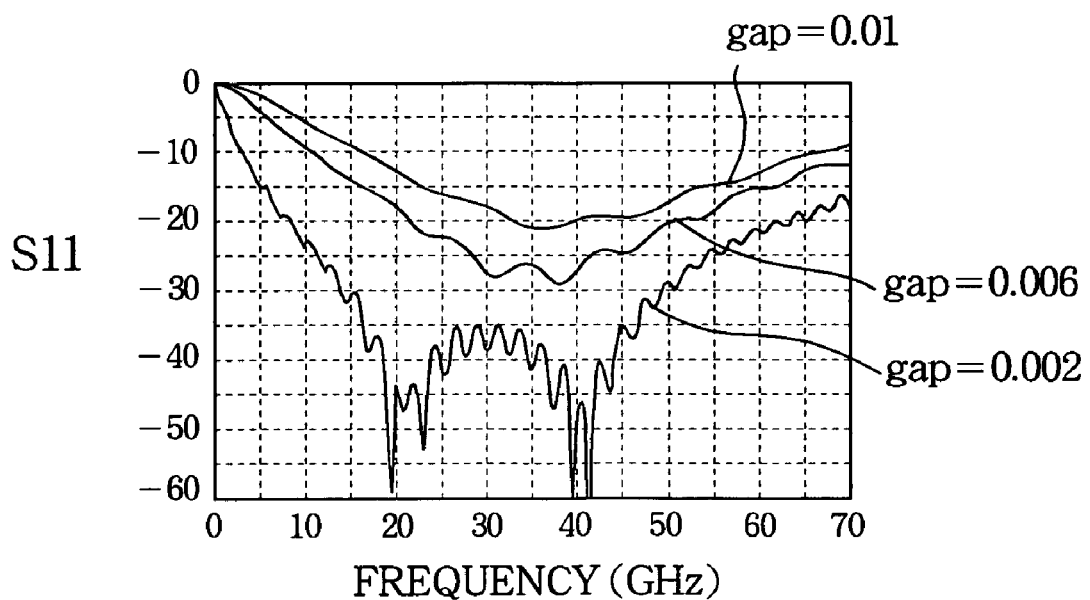

FIGS. 20A, 20B, and 20C illustrate typical directional coupler structures. In FIG. 20A, a layer of material with a high dielectric constant is inserted into the structure. In FIG. 20B, the directional coupler has an air layer, which is equivalent to the insertion of a layer of material with a low dielectric constant; the dielectric constant ratio is 1:3.2. FIG. 20C is a top view of the directional coupler in either FIG. 20A or 20B, indicating that the energy input line pair and energy transmitting line pair are connected to external circuits at mutually opposite ends (PORT-1, PORT-2) and are left open at their unconnected ends. The electromagnetic fields are scalable; FIG. 21 gives dimensions of the directional couplers for three exemplary scaling values. D is the thickness of the dielectric layer between the two lines in each line pair, t is the thickness of the conductor layer (of the energy input pair line), w is the width of the conductor layer, L is the length of the signal line, and g is the distance between the adjacent signal line pairs; $h_1$ (0.4 mm, for example) is the height of the dielectric layer above the energy transmitting line pair, and $h_2$ (0.68 mm, for example) is the height of the dielectric layer in which the energy transmitting line pair is disposed.

FIGS. 22A, 22B, 23A, and 23B are graphs showing results of simulation of exemplary directional couplers. The directional coupler simulated in FIGS. 22A and 22B has a layer of high dielectric material inserted as shown in FIG. 20A; the directional coupler simulated in FIGS. 23A and 23B has a layer of low dielectric material as shown in FIG. 20B. Since the input end of the energy input line pair is port-1 and the output end of the energy transmitting line pair is port-2, S21 is the transmission characteristic, and S11 is the reflection characteristic.

In a directional coupler of the type with a layer of high dielectric material inserted as shown in FIG. 20A, the energy transmitting line pair is disposed in silicon dioxide ($SiO_2$), which is the same type of dielectric material in which surrounding interconnections are disposed, having a relative dielectric constant ($\epsilon_r$) of 3.2; the energy input line pair is disposed in alumina, which has a higher dielectric constant ($\epsilon_r=8$).

In a directional coupler of the type with a layer of low dielectric material as shown in FIG. 20B, the energy transmitting line pair is disposed in silicon dioxide ($\epsilon_r=3.2$), as are the surrounding interconnections; the energy input line pair is disposed in air, which has a lower dielectric constant ($\epsilon_r=1$) The energy input line pair can also be disposed in a dielectric material having a lower dielectric constant than silicon dioxide.

As indicated by the dimensions in FIG. 21, the embodiments of the present invention provide miniature directional couplers having the simple structures shown in FIGS. 20A, 20B, and 20C, which can be realized in an IC chip. If the difference between the dielectric constants of the dielectric materials in which the two line pairs of the directional coupler are disposed is increased, the gap (g) between the line pairs can be increased, and the other coupler dimensions can be reduced.

In FIG. 20A, the TEM waveform is distorted in the line pair disposed in the dielectric layer (alumina) which has a higher dielectric constant than the surrounding dielectric layers (silicon dioxide); in FIG. 20B, the TEM waveform is distorted in the directional coupler disposed in the dielectric layer (air) which has a lower dielectric constant than the surrounding dielectric layer (silicon dioxide). Although FIG. 20B shows an air layer disposed on a dielectric layer of silicon dioxide with a relative dielectric constant of 3.2, similar effects can be provided if the relative dielectric constants of the upper dielectric layer and the lower dielectric layer are 3.2 and 9.6.

Figure 24A:
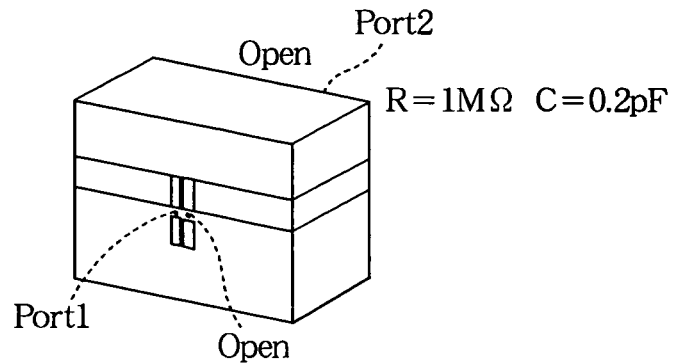
FIG. 24A is a perspective view illustrating parameters used in simulation of a directional coupler of the type shown in FIG. 20A by the Simulation Program with Integrated Circuit Emphasis (SPICE)
Figure 24B:
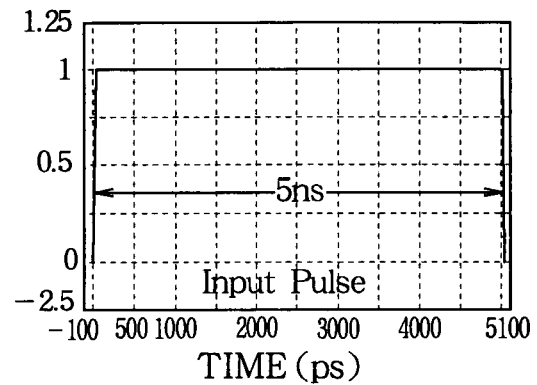
FIG. 24B is a graph of an input pulse used in the SPICE simulation in FIG. 24A.
Figure 24C:
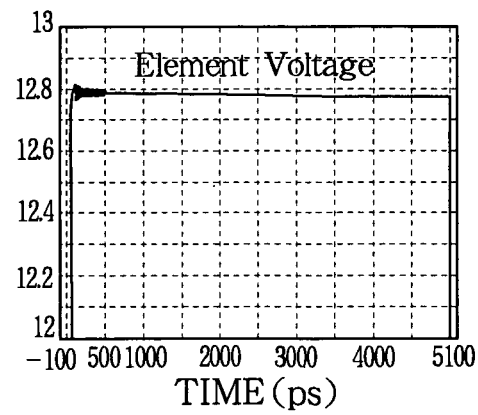
FIG. 24C is a graph of an output voltage waveform derived by the SPICE simulation in FIG. 24A.
Figure 24D:
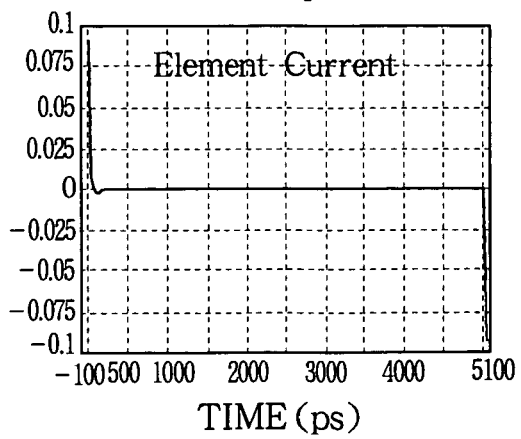
FIG. 24D is a graph of an output current waveform derived by the SPICE simulation in FIG. 24A.
Figure 25A:
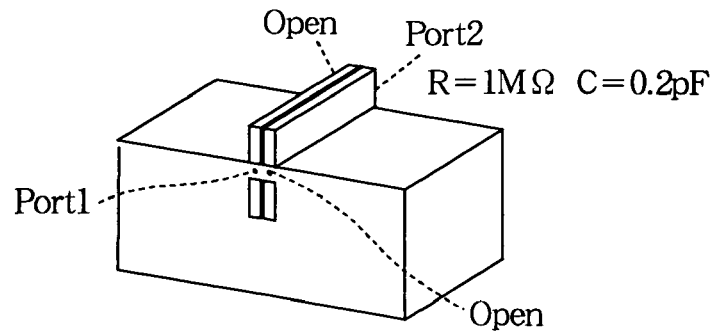
FIG. 25A is a perspective view illustrating parameters used in a SPICE simulation of a directional coupler of the type shown in FIG. 20B.
Figure 25B:
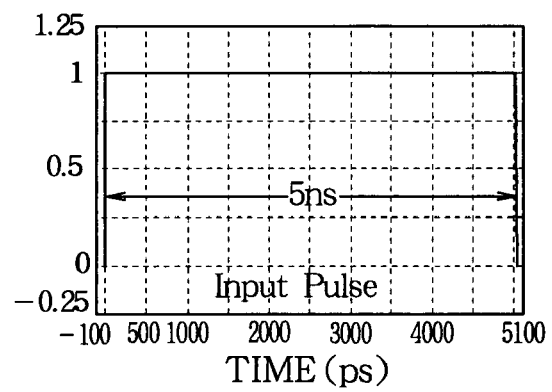
FIG. 25B is a graph of an input pulse used in the SPICE simulation in FIG. 25A.
Figure 25C:
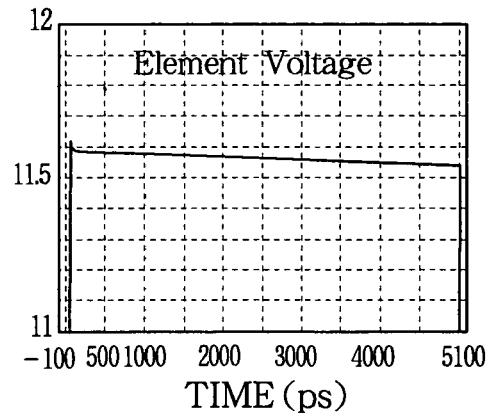
FIG. 25C is a graph of an output voltage waveform derived by the SPICE simulation in FIG. 25A.
Figure 25D:
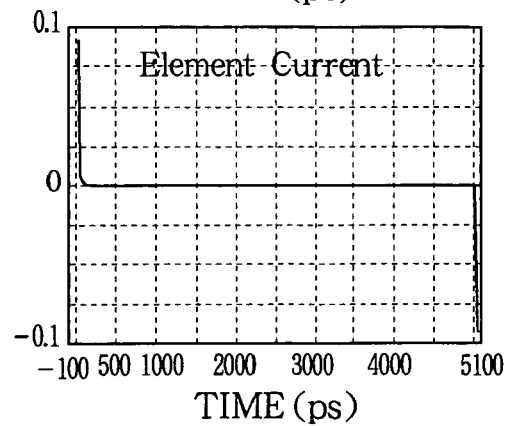
FIG. 25D is a graph of an output current waveform derived by the SPICE simulation in FIG. 25A.

FIGS. 24A to 24D and 25A to 25D illustrate results of directional coupler simulation by the well-known Simulation Program with Integrated Circuit Emphasis (SPICE). FIGS. 24A and 25A show the simulated types of directional couplers, FIGS. 24B and 25B show input pulse waveforms, FIGS. 24C and 25C show output voltage waveforms, and FIGS. 24D and 25D show output current waveforms. The directional coupler in FIGS. 24A, 24B, 24C, and 24D has a layer of high dielectric material inserted as shown in FIG. 20A, and is simulated by using the S21 parameter in FIG. 22A; the directional coupler in FIGS. 25A, 25B, 25C, and 25D has a layer of low dielectric material inserted as shown in FIG. 20B, and is simulated by using the S21 parameter in FIG. 23A.

The input pulse in these simulations has a rise time of twenty-five picoseconds ($t_r=25$ ps) and a hold time of five nanoseconds (5 ns); the gate capacitance of the transistors in the receiver, including the parasitic capacitance, is 0.2 picofarads (pF), and the leakage current resistance is 1 MΩ. The simulations show no problems whatsoever with these types of directional coupler.

Although it has been assumed that the driver, the signal transmission line, the directional couplers, and the receiver are formed in the same semiconductor chip in the embodiments described above, the driver and the receiver may be formed in different semiconductor chips, and the interconnection structure including the signal transmission line and directional coupler(s) of the present invention may be disposed between the chips.

The invented interconnection structure comprising a signal transmission line and directional coupler(s) can be used for interconnections in a logic circuit or a memory circuit. In this case, an interconnection structure without a driver and/or receiver may be used.

Figure 26:
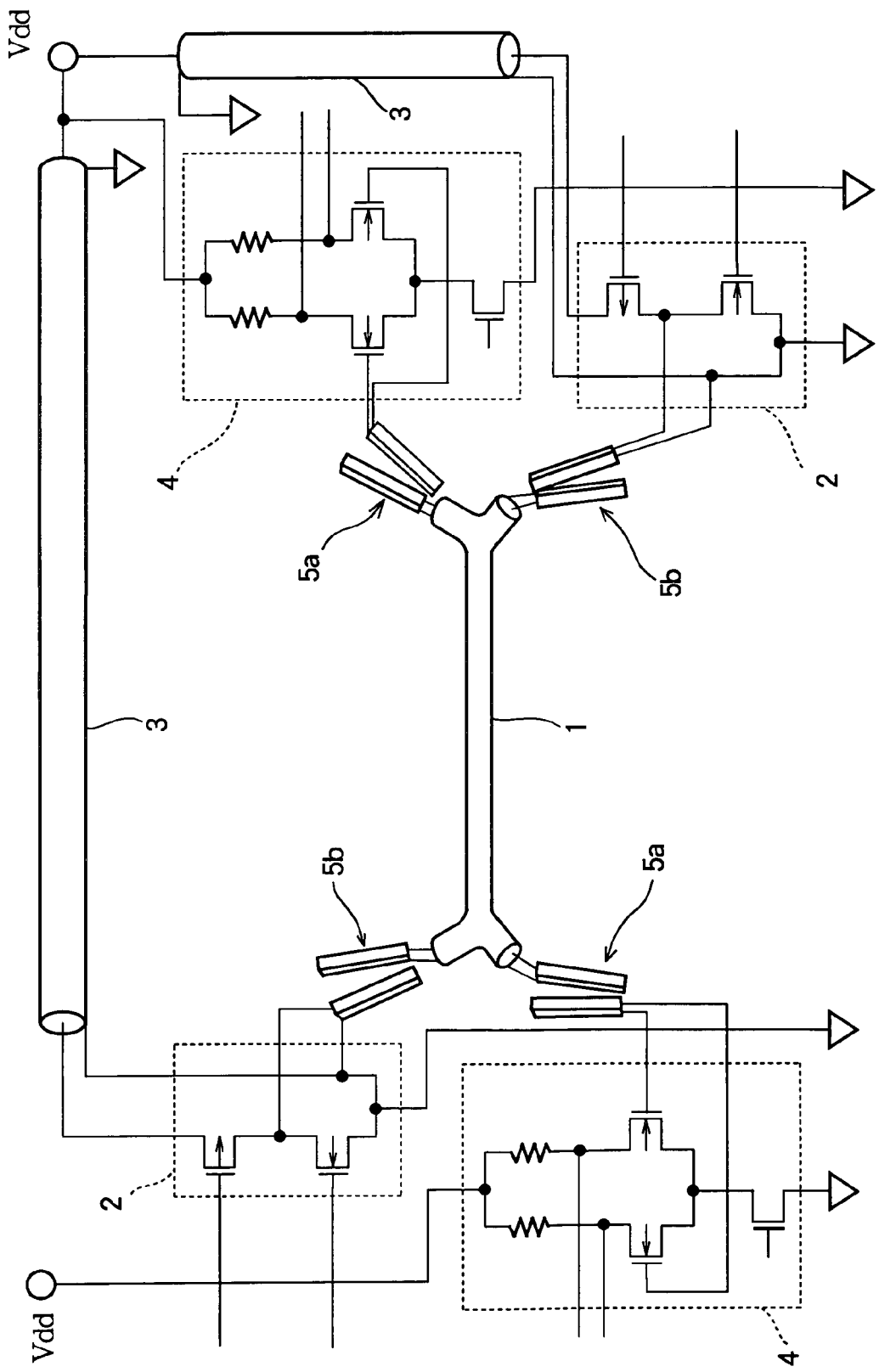
FIG. 26 is a schematic diagram illustrating a variation of the second embodiment adapted for bi-directional signal transmission.

The embodiments described above may be modified for bi-directional transmission of digital signals by branching the transmitting and receiving ends of the signal transmission line and providing a driver and a receiver at each end. FIG. 26 shows an example of this modification based on the second embodiment. The directional couplers 5a, 5b obviate the need for tri-state drivers. The directional couplers 5b disposed between the drivers 2 and the signal transmission line 1 suffice to assure that when one driver is inactive, it will not interfere with the transmission of a digital signal by the other driver.

Those skilled in the art will recognize that further variations are possible within the scope of invention, which is defined by the appended claims.

What is claimed is:

1. A signal transmission apparatus, comprising:
a signal transmission line having a transmitting end, a receiving end, and a characteristic impedance, including a signal-line element having a resistance-capacitance delay, for transmitting a digital signal input at the transmitting end;
a first driver having an inverter structure and an on-resistance, for supplying the digital signal to the transmitting end of the signal transmission line;
a power-ground transmission fine pair for supplying power to the first driver, having a characteristic impedance less than a sum of the on-resistance of the first driver and the characteristic impedance of the signal transmission line, the power-ground transmission line pair including a power line and a ground line, the power line and the ground line running adjacent to each other;
a first receiver having a differential amplifier structure, for receiving the digital signal from the receiving end of the signal transmission line and detecting the received digital signal; and
a first directional coupler connected between the first driver and the transmitting end of the signal transmission line, or between the receiving end of the signal transmission line and the first receiver, for blocking a direct-current component of the digital signal and passing a wideband alternating-current component of the digital signal.

2. The signal transmission apparatus of claim 1, wherein all signal-line elements from output interconnections in the first driver to input interconnections in the first receiver, including all signal-line elements in the signal transmission line and all signal-line elements in the first directional coupler, are metallic.

3. The signal transmission apparatus of claim 1, wherein a transmission line structure is maintained in all signal-line elements from output interconnections in the first driver to input interconnections in the first receiver, including all signal-line elements in the signal transmission line and all signal-line elements in the first directional coupler.

4. The signal transmission apparatus of claim 1, wherein the first directional coupler is connected between the receiving end of the signal transmission line and the first receiver, and no directional coupler is connected between the first driver and the transmitting end of the signal transmission line.

5. The signal transmission apparatus of claim 1, wherein the first directional coupler is connected between the first driver and the transmitting end of the signal transmission line, further comprising a second directional coupler connected to the receiving end of the signal transmission line.

6. The signal transmission apparatus of claim 5, wherein:
the second directional coupler is connected between the receiving end of the signal transmission line and the first receiver;
the first directional coupler includes a first energy input line pair having an open and floating output end and a first energy transmitting line pair having an open and floating input end; and
the second directional coupler includes a second energy input line pair having an open and floating output end and a second energy transmitting line pair having an open and floating input end.

7. The signal transmission apparatus of claim 5, wherein:
the first receiver is connected directly to the receiving end of the signal transmission line;
the first directional coupler includes a first energy input line pair having an open and floating output end and a first energy transmitting line pair having an open and floating input end; and
the second directional coupler includes a second energy input line pair having an open and floating output end and a second energy transmitting line pair having an open and floating input end;
further comprising a terminating resistor connected across an output end of the second energy transmitting line pair, for preventing signal reflection.

8. The signal transmission apparatus of claim 1, wherein the second directional coupler and the terminating resistor are metallic.

9. The signal transmission apparatus of claim 1, wherein the first directional coupler is connected between the first driver and the transmitting end of the signal transmission line and no directional coupler is coupled to the receiving end of the signal transmission line.

10. The signal transmission apparatus of claim 9, wherein:
the first directional coupler includes a first energy input line pair having an open and floating output end and a first energy transmitting line pair having an open and floating input end; and
the first receiver is connected directly to the receiving end of the signal transmission line;
further comprising a terminating resistor connected across the receiving end of the signal transmission line, for preventing signal reflection.

11. The signal transmission apparatus of claim 10, wherein the first directional coupler and the terminating resistor are metallic.

12. The signal transmission apparatus of claim 1, wherein the first driver includes a p-channel metal-oxide-semiconductor (MOS) transistor and an n-channel MOS transistor connected to form an inverter.

13. The signal transmission apparatus of claim 1, wherein the first driver includes:
a pair of n-channel (MOS) transistors connected to form an inverter; and
a pair of inversion mode MOS varactors for pumping a source-drain capacitance of the n-channel MOS transistors up and down.

14. The signal transmission apparatus of claim 1, wherein the first receiver comprises:
a differential pair of input transistors; and
a latch circuit connected as an output stage to the differential pair of input transistors.

15. The signal transmission apparatus of claim 1, wherein the characteristic impedance of the signal transmission line is uniform from the transmitting end to the receiving end.

16. The signal transmission apparatus of claim 1, wherein the signal transmission line is disposed in a homogenous dielectric material having a uniform dielectric constant.

17. The signal transmission apparatus of claim 1, wherein the signal transmission line is a stacked-pair transmission line, a pair-coplanar transmission line, or a guarded coplanar transmission line.

18. The signal transmission apparatus of claim 1, wherein the first driver, the signal transmission line, the first directional coupler, and the first receiver are formed in a single semiconductor chip.

19. The signal transmission apparatus of claim 1, wherein the first driver and the first receiver are formed in different semiconductor chips, and an interconnection structure including the signal transmission line and the first directional coupler is disposed between the chips.

20. The signal transmission apparatus of claim 1, wherein the signal transmission line is branched at both its transmitting end and its receiving end for bi-directional signal transmission, further comprising:
a second driver having an inverter structure and an on-resistance;
a second directional coupler coupling the second driver to the receiving end of the signal transmission line;
a second receiver having a differential amplifier structure, coupled to the transmitting end of the signal transmission line to receive a signal transmitted by the second driver.

21. A signal transmission apparatus, comprising:
a signal transmission line having a transmitting end, a receiving end, and a characteristic impedance, including a signal-line element having a resistance-capacitance delay, for transmitting a digital signal input at the transmitting end;
a first driver having an inverter structure and an on-resistance, for supplying the digital signal to the transmitting end of the signal transmission line;
a power-ground transmission line pair for supplying power to the first driver, having a characteristic impedance low enough to drive a sum of the on-resistance of the first driver and the characteristic impedance of the signal transmission line;
a first receiver having a differential amplifier structure, for receiving the digital signal from the receiving end of the signal transmission line and detecting the received digital signal; and
a first directional coupler connected between the first driver and the transmitting end of the signal transmission line, or between the receiving end of the signal transmission line and the first receiver, for blocking a direct-current component of the digital signal and passing a wideband alternating-current component of the digital signal,
wherein the first directional coupler includes an energy input line pair and an energy transmitting line pair, both having a predetermined length, disposed in close proximity in materials of different dielectric constants, the energy input line pair being separated from the energy transmitting line pair by a predetermined gap.

22. The signal transmission apparatus of claim 21, wherein the material in which the energy input line pair is disposed has a higher dielectric constant than the material in which the energy transmitting line pair and surrounding interconnecting lines are disposed.

23. The signal transmission apparatus of claim 21, wherein the energy input line pair is disposed in air or another material having a lower dielectric constant than the material in which the energy transmitting line pair and surrounding interconnecting lines are disposed.

24. A signal transmission apparatus, comprising:
a signal transmission line having a transmitting end, a receiving end, and a characteristic impedance, including a signal-line element having a resistance-capacitance delay, for transmitting a digital signal input at the transmitting end;
a first driver having an inverter structure and an on-resistance, for supplying the digital signal to the transmitting end of the signal transmission line;
a power-ground transmission line pair for supplying power to the first driver, having a characteristic impedance low enough to drive a sum of the on-resistance of the first driver and the characteristic impedance of the signal transmission line;
a first receiver having a differential amplifier structure, for receiving the digital signal from the receiving end of the signal transmission line and detecting the received digital signal; and
a first directional coupler connected between the first driver and the transmitting end of the signal transmission line, or between the receiving end of the signal transmission line and the first receiver, for blocking a direct-current component of the digital signal and passing a wideband alternating-current component of the digital signal,
wherein the first directional coupler is connected between the receiving end of the signal transmission line and the first receiver, and no directional coupler is connected between the first driver and the transmitting end of the signal transmission line, and
wherein the first directional coupler includes an energy input line pair having an open and floating output ends and an energy transmitting line pair having an open and floating input end.

25. A signal transmission apparatus, comprising:
a signal transmission line having a transmitting end, a receiving end, and a characteristic impedance, including a signal-line element having a resistance-capacitance delay, for transmitting a digital signal input at the transmitting end;
a first driver having an inverter structure and an on-resistance, for supplying the digital signal to the transmitting end of the signal transmission line;
a power-ground transmission line pair for supplying power to the first driver, having a characteristic impedance low enough to drive a sum of the on-resistance of the first driver and the characteristic impedance of the signal transmission line;
a first receiver having a differential amplifier structure, for receiving the digital signal from the receiving end of the signal transmission line and detecting the received digital signal; and
a first directional coupler connected between the first driver and the transmitting end of the signal transmission line, or between the receiving end of the signal transmission line and the first receiver, for blocking a direct-current component of the digital signal and passing a wideband alternating-current component of the digital signal,
wherein the first receiver comprises
a substrate, and
a differential pair of input MOS transistors disposed in a single well, the single well being electrically isolated from the substrate.

26. The signal transmission apparatus of claim 25, wherein the first receiver further comprises a current control MOS transistor having a drain supplying current to the differential pair of input MOS transistors, the drain also being coupled to the single well in which the differential paid of input MOS transistors are disposed, thereby providing a back gate bias for the differential pair of input MOS transistors.

27. A signal transmission apparatus, comprising:

a signal transmission line having a transmitting end, a receiving end, and a characteristic impedance, including a signal-line element having a resistance-capacitance delay, for transmitting a digital signal input at the transmitting end;

a first driver having an inverter structure and an on-resistance, for supplying the digital signal to the transmitting end of the signal transmission line;

a power-ground transmission line pair for supplying rower to the first driver, having a characteristic impedance low enough to drive a sum of the on-resistance of the first driver and the characteristic impedance of the signal transmission line;

a first receiver having a differential amplifier structure, for receiving the digital signal from the receiving end of the signal transmission line and detecting the received digital signal; and a first directional coupler connected between the first driver and the transmitting end of the signal transmission line, or between the receiving end of the signal transmission line and the first receiver, for blocking a direct-current component of the digital signal and passing a wideband alternating-current component of the digital signal, wherein the signal transmission line satisfies the following condition, in which L denotes signal line length, $\lambda$ denotes a sinewave signal component wavelength, v denotes an electromagnetic wave velocity on the signal transmission line, and f denotes a maximum frequency of a pulse signal transmitted on the signal line:

$$L \geq (1/40)\lambda = (1/40)(v/f).$$

28. A signal transmission apparatus, comprising:

a signal transmission line having a transmitting end, a receiving end, and a characteristic impedance, including a signal-line element having a resistance-capacitance delay, for transmitting a digital signal input at the transmitting end;

a first driver having an inverter structure and an on-resistance, for supplying the digital signal to the transmitting end of the signal transmission line;

a power-ground transmission line pair for supplying power to the first driver, having a characteristic impedance low enough to drive a sum of the on-resistance of the first driver and the characteristic impedance of the signal transmission line;

a first receiver having a differential amplifier structure, for receiving the digital signal from the receiving end of the signal transmission line and detecting the received digital signal; and a first directional coupler connected between the first driver and the transmitting end of the signal transmission line, or between the receiving end of the signal transmission line and the first receiver, for blocking a direct-current component of the digital signal and passing a wideband alternating-current component of the digital signal, wherein the signal transmission line satisfies the following condition, in which d denotes a distance between facing sides of a pair of signal-line elements in the signal transmission line, w denotes a conductor width of the facing sides, t denotes a conductor thickness, and s denotes a spacing between adjacent signal transmission lines:

$$2wd < ts.$$

29. A signal transmission apparatus, comprising:

a signal transmission line having a transmitting end, a receiving end, and a characteristic impedance, including a signal-line element having a resistance-capacitance delay, for transmitting a digital signal input at the transmitting end;

a first driver having an inverter structure and an on-resistance, for supplying the digital signal to the transmitting end of the signal transmission line;

a power-ground transmission line pair for supplying power to the first driver, having a characteristic impedance low enough to drive a sum of the on-resistance of the first driver and the characteristic impedance of the signal transmission line;

a first receiver having a differential amplifier structure, for receiving the digital signal from the receiving end of the signal transmission line and detecting the received digital signal; and a first directional coupler connected between the first driver and the transmitting end of the signal transmission line, or between the receiving end of the signal transmission line and the first receiver, for blocking a direct-current component of the digital signal and passing a wideband alternating-current component of the digital signal, wherein the power-ground transmission line pair supplies electrical energy to n first drivers, where n is a positive integer, and the characteristic impedance $Z_{Op}$ of the power-ground line pair and the characteristic impedance $Z_{Os}$ of the signal transmission line satisfy the following condition:

$$Z_{Op} < Z_{Os}/n.$$

* * * * *